(12) United States Patent
Ban

(10) Patent No.: US 11,423,291 B2
(45) Date of Patent: Aug. 23, 2022

(54) ARITHMETIC DEVICE AND ARITHMETIC METHOD

(71) Applicant: KABUSHIKI KAISHA TOSHIBA, Minato-ku (JP)

(72) Inventor: Koichiro Ban, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 386 days.

(21) Appl. No.: 16/801,025

(22) Filed: Feb. 25, 2020

(65) Prior Publication Data

US 2020/0410331 A1 Dec. 31, 2020

(30) Foreign Application Priority Data

Jun. 26, 2019 (JP) .............................. JP2019-118757

(51) Int. Cl.
*G06N 3/063* (2006.01)
*G06F 9/30* (2018.01)
*G06F 17/16* (2006.01)

(52) U.S. Cl.
CPC ............ *G06N 3/063* (2013.01); *G06F 9/3001* (2013.01); *G06F 9/3013* (2013.01); *G06F 17/16* (2013.01)

(58) Field of Classification Search
None
See application file for complete search history.

(56) References Cited

U.S. PATENT DOCUMENTS 7,607,132 B2 * 10/2009 Liu ..................... G06F 9/4881
  718/102
8,782,115 B1 * 7/2014 Dhanoa ............... H04L 25/0246
  708/514

(Continued)

FOREIGN PATENT DOCUMENTS

JP 6365258 B2 8/2018
JP 6387913 B2 9/2018

OTHER PUBLICATIONS

Nguyen. H.K., et al.., A Reconfigurable Multi-function DMA Controller for High-Performance Computer Systems.2018,IEEE, 6 pages. (Year: 2018).*

(Continued)

*Primary Examiner* — Eric Coleman
(74) *Attorney, Agent, or Firm* — Oblon, McClelland, Maier & Neustadt, L.L.P.

(57) ABSTRACT

An arithmetic device includes storage, a controller, and operation circuitry. The storage stores therein P-dimensional input vectors, P×N-dimensional matrixes, N-dimensional intermediate value vectors, and N-dimensional output vectors, and is capable of executing, in parallel, two or more of reading processing of the input vector, reading processing of the matrix, reading processing of the intermediate value vector, and writing processing of the output vector. The controller sets read timings of a first input vector, a first matrix, and a first intermediate value vector, and write timing of a first output vector, in operation processing including a D-dimensional processing loop. The operation circuitry calculates product of the first input vector and the first matrix, calculates sum of the product and the first intermediate value vector, and stores the sum as the first output vector in the storage.

11 Claims, 28 Drawing Sheets

(56) References Cited

U.S. PATENT DOCUMENTS

| | | | | |
|---|---|---|---|---|
| 8,805,911 | B1* | 8/2014 | Xu | G06F 17/16 |
| | | | | 708/446 |
| 10,430,493 | B1* | 10/2019 | Kendall | G11C 13/0028 |
| 10,691,114 | B2* | 6/2020 | Shih | G05B 19/41865 |
| 11,301,713 | B2* | 4/2022 | Sombatsiri | G06V 10/454 |

OTHER PUBLICATIONS

Tugsinavisut, S. et al., Efficient Asynchronous Bundled-Data Pipelines for DCT Matrix-Vector Multiplication, 2005,IEEE,pp. 448-461. (Year: 2005).*

Umuroglu, y. et al., Bismo: Ascalable Bit-Serial Matrix Multiplication Overlay for Reconfigurable Computing) , 2018, IEEE, pp. 307-314. (Year: 2018).*

NVDLA Documentation, Unit Description (Fig.54), http://nvdla.org/hw/v1/ias/unit_description.html , Jun. 24, 2019, 38 pages.

* cited by examiner

FIG.4

| SETTING PARAMETER NAME | FUNCTION | REGISTER/OPERAND |
|---|---|---|
| wadr0 | BASE VALUE OF START ADDRESS OF WEIGHT MATRIX | REGISTER |
| sadr0 | BASE VALUE OF START ADDRESS OF SRC VECTOR | REGISTER |
| dadr0 | BASE VALUE OF START ADDRESS OF DST VECTOR | REGISTER |
| X | BASE VALUE OF PROCESSING SIZE IN X DIRECTION | REGISTER |
| Y | BASE VALUE OF PROCESSING SIZE IN Y DIRECTION | REGISTER |
| Z | BASE VALUE OF PROCESSING SIZE IN Z DIRECTION | REGISTER |
| $\Delta wx$ | INCREMENT VALUE IN x DIRECTION OF WEIGHT MATRIX ADDRESS | REGISTER |
| $\Delta wy$ | INCREMENT VALUE IN y DIRECTION OF WEIGHT MATRIX ADDRESS | REGISTER |
| $\Delta wz$ | INCREMENT VALUE IN z DIRECTION OF WEIGHT MATRIX ADDRESS | REGISTER |
| $\Delta sx$ | INCREMENT VALUE IN x DIRECTION OF ADDRESS OF SRC VECTOR | REGISTER |
| $\Delta sy$ | INCREMENT VALUE IN y DIRECTION OF ADDRESS OF SRC VECTOR | REGISTER |
| $\Delta sz$ | INCREMENT VALUE IN z DIRECTION OF ADDRESS OF SRC VECTOR | REGISTER |
| $\Delta dx$ | INCREMENT VALUE IN x DIRECTION OF ADDRESS OF DST VECTOR | REGISTER |
| $\Delta dy$ | INCREMENT VALUE IN y DIRECTION OF ADDRESS OF DST VECTOR | REGISTER |
| $\Delta dz$ | INCREMENT VALUE IN z DIRECTION OF ADDRESS OF DST VECTOR | REGISTER |
| scheduling | SET SCHEDULING | REGISTER |
| init_cond_x | SET INITIAL CONDITION x | REGISTER |
| init_cond_y | SET INITIAL CONDITION y | REGISTER |
| init_cond_z | SET INITIAL CONDITION z | REGISTER |
| last_cond_x | SET LAST CONDITION x | REGISTER |
| last_cond_y | SET LAST CONDITION y | REGISTER |
| last_cond_z | SET LAST CONDITION z | REGISTER |
| init_flag | INITIAL FLAG | OPERAND |
| last_flag | LAST FLAG | OPERAND |
| wadr_offset | OFFSET OF START ADDRESS OF WEIGHT MATRIX | OPERAND |
| sadr_offset | OFFSET OF START ADDRESS OF SRC VECTOR | OPERAND |
| dadr_offset | OFFSET OF START ADDRESS OF DST VECTOR AND OUT VECTOR | OPERAND |
| X_offset | OFFSET OF PROCESSING SIZE IN X DIRECTION | OPERAND |
| Y_offset | OFFSET OF PROCESSING SIZE IN Y DIRECTION | OPERAND |
| Z_offset | OFFSET OF PROCESSING SIZE IN Z DIRECTION | OPERAND |

FIG.6

| NAME OF PROCESSING | PROCESSING DETAILS |
|---|---|
| WEIGHT PROCESSING | CALCULATE WEIGHT MATRIX ADDRESS<br>READ WEIGHT MATRIX |
| SRC PROCESSING | CALCULATE SRC ADDRESS<br>READ SRC VECTOR |
| DST PROCESSING | CALCULATE DST ADDRESS<br>READ DST VECTOR<br>(HOWEVER, USE REGISTER VALUE AS DST VECTOR WITHOUT READING DST VECTOR, WHEN INITIAL CONDITIONS ARE SATISFIED) |
| OUT PROCESSING | WRITE OUT VECTOR<br>(HOWEVER, APPLY NONLINEAR OPERATION BEFORE WRITING WHEN FINIAL CONDITIONS ARE SATISFIED) |

FIG.7

| PROCESSING NUMBER | WS | OS1 | OS2 |
|---|---|---|---|
| FIRST PROCESSING | NO PROCESSING | DST PROCESSING | NO PROCESSING |
| SECOND PROCESSING | WEIGHT PROCESSING | NO PROCESSING | DST PROCESSING |
| THIRD PROCESSING | NO PROCESSING | NO PROCESSING | NO PROCESSING |
| FOURTH PROCESSING | SRC PROCESSING<br>DST PROCESSING | WEIGHT PROCESSING<br>SRC PROCESSING | WEIGHT PROCESSING<br>SRC PROCESSING |
| FIFTH PROCESSING | OUT PROCESSING | NO PROCESSING | NO PROCESSING |
| SIXTH PROCESSING | NO PROCESSING | NO PROCESSING | NO PROCESSING |
| SEVENTH PROCESSING | NO PROCESSING | NO PROCESSING | OUT PROCESSING |
| EIGHTH PROCESSING | NO PROCESSING | OUT PROCESSING | NO PROCESSING |

FIG.8

```
for z in [0,1,...,Z+Z_offset-1]:
  wadr = wadr0 + wadr_offset + zΔwz (*)
  wmat = read_weight(wadr)
  for y in [0,1,...,Y+Y_offset-1]:
    for x in [0,1,...,X+X_offset-1]:
      sadr = sadr0 + sadr_offset + xΔsx + yΔsy + zΔsz
      dadr = dadr0 + dadr_offset + xΔdx + yΔdy   (*)
      svec = read_src(sadr)
      if init_condition(init_flag, x,y,z):
        dvec = reg
      else:
        dvec = read_dst(dadr)
      end
      dvec = svec×wmat + dvec
      if last_condition(last_flag, x,y,z):
        dvec = non_linear(dvec)
      end
      write(dadr) = dvec
    end
  end
end (*) SUPPOSE THAT Δwx=Δwy=Δdz=0
```

FIG.9

```
dadr = dadr0 + dadr_offset        (*)
if init_flag:
  dvec = reg
else:
  dvec = read_dst(dadr)
end
for z in [0,1,...,Z+Z_offset-1]:
  for y in [0,1,...,Y+Y_offset-1]:
    for x in [0,1,...,X+X_offset-1]:
      wmat = read_weight(wadr)
      wadr = wadr0 + wadr_offset + xΔwx + yΔwy + zΔwz
      sadr = sadr0 + sadr_offset + xΔsx + yΔsy + zΔsz
      svec = read_src(sadr)
      dvec = svec×wmat + dvec
    end
  end
end
if last_flag:
  dvec = non_linear(dvec)
end
write(dadr) = dvec (*) SUPPOSE THAT Δdx=Δdy=Δdz=0
```

FIG.10

```
for z in [0,1,...,Z+Z_offset-1]:
  dadr = dadr0 + dadr_offset + zΔdz (*)
  if init_condition(init_flag, z):
    dvec = reg
  else:
    dvec = read_dst(dadr)
  end
  for y in [0,1,...,Y+Y_offset-1]:
    for x in [0,1,...,X+X_offset-1]:
      wmat = read_weight(wadr)
      wadr = wadr0 + wadr_offset + xΔwx + yΔwy + zΔwz
      sadr = sadr0 + sadr_offset + xΔsx + yΔsy + zΔsz
      svec = read_src(sadr)
      dvec = svec×wmat + dvec
    end
  end
  if last_condition(last_flag, z):
    dvec = non_linear(dvec)
  end
  write(dadr) = dvec
end (*) SUPPOSE THAT Δdx=Δdy=0
```

FIG.11

DEFINITIONS OF VARIABLES:
wadr: WEIGHT MATRIX READ ADDRESS
sadr: SRC VECTOR READ ADDRESS
dasr: DST VECTOR READ ADDRESS = OUT VECTOR WRITE ADDRESS
wmat: WEIGHT MATRIX
svec: SRC VECTOR
dvec: DST VECTOR, OUT VECTOR, OR CALCULATION INTERMEDIATE
     VALUE THEREOF
reg : CUMULATIVE REGISTER DEFINITIONS OF FUNCTIONS
read_weight(x): READING OF WEIGHT MATRIX FROM ADDRESS x
read_src(x): READING OF SRC VECTOR FROM ADDRESS x
read_dst(x): READING OF DST VECTOR FROM ADDRESS x
write(x): WRITING OF OUT VECTOR TO ADDRESS x
non_linear(): NONLINEAR OPERATION PROCESSING
init_condition(): EVALUATION FUNCTION AS TO WHETHER INITIAL
                 CONDITIONS ARE SATISFIED
last_condition(): EVALUATION FUNCTION AS TO WHETHER LAST
                 CONDITIONS ARE SATISFIED

FIG.13

```
for z in [0,1,...,Z+Z_offset-1]:
 for y in [0,1,...,Y+Y_offset-1]:
  for x in [0,1,...,X+X_offset-1]:
    wadr = wadr0 + wadr_offset + xΔwx + yΔwy + zΔwz (*)
    if wadr is updated:
        wmat = read_weight(wadr)
    sadr = sadr0 + sadr_offset + xΔsx + yΔsy + zΔsz
    if sadr is updated:
       svec = read_src(sadr)
    end
    dadr = dadr0 + dadr_offset + xΔdx + yΔdy + zΔdz (*)
    if dadr is updated:
       if init_condition(init_flag,x,y,z):
            dvec = reg
       else
          dvec = read_dst(dadr)
       end
    dvec = svec×wmat + dvec
    if write_condition is met:
       if last_condition(last_flag,x,y,z):
            dvec = non_linear(dvec)
       end
       write(dadr) = dvec
    end
  end
 end
end (*) Δwx=Δwy=Δdz
```

FIG.15

| 4 | 5 | 6 |
|---|---|---|
| 7 | 0 | 8 |
| 1 | 2 | 3 |

FIG.29

| SETTING PARAMETER NAME | FUNCTION | REGISTER/OPERAND |
|---|---|---|
| V | BASE VALUE OF PROCESSING SIZE IN V DIRECTION | REGISTER |
| W | BASE VALUE OF PROCESSING SIZE IN W DIRECTION | REGISTER |
| Δwv | INCREMENT VALUE IN v DIRECTION OF WEIGHT MATRIX ADDRESS | REGISTER |
| Δww | INCREMENT VALUE IN w DIRECTION OF WEIGHT MATRIX ADDRESS | REGISTER |
| Δsv | INCREMENT VALUE IN v DIRECTION OF ADDRESS OF SRC VECTOR | REGISTER |
| Δsw | INCREMENT VALUE IN w DIRECTION OF ADDRESS OF SRC VECTOR | REGISTER |
| Δdv | INCREMENT VALUE IN v DIRECTION OF ADDRESS OF DST VECTOR | REGISTER |
| Δdw | INCREMENT VALUE IN w DIRECTION OF ADDRESS OF DST VECTOR | REGISTER |
| init_cond_v | SET INITIAL CONDITION v | REGISTER |
| init_cond_w | SET INITIAL CONDITION w | REGISTER |
| last_cond_v | SET LAST CONDITION v | REGISTER |
| last_cond_w | SET LAST CONDITION w | REGISTER |
| V_offst | OFFSET OF PROCESSING SIZE IN V DIRECTION | OPERAND |
| W_offset | OFFSET OF PROCESSING SIZE IN W DIRECTION | OPERAND |

FIG.30

| PROCESSING NUMBER | WS | OS1 | OS2 |
|---|---|---|---|
| FIRST PROCESSING | NO PROCESSING | DST PROCESSING | NO PROCESSING |
| SECOND PROCESSING | WEIGHT PROCESSING | NO PROCESSING | DST PROCESSING |
| THIRD PROCESSING | NO PROCESSING | NO PROCESSING | NO PROCESSING |
| FOURTH PROCESSING | SRC PROCESSING DST PROCESSING | WEIGHT PROCESSING SRC PROCESSING | WEIGHT PROCESSING SRC PROCESSING |
| FIFTH PROCESSING | OUT PROCESSING | NO PROCESSING | NO PROCESSING |
| SIXTH PROCESSING | NO PROCESSING | NO PROCESSING | NO PROCESSING |
| SEVENTH PROCESSING | NO PROCESSING | NO PROCESSING | OUT PROCESSING |
| EIGHTH PROCESSING | NO PROCESSING | OUT PROCESSING | NO PROCESSING |
| NINTH PROCESSING | NO PROCESSING | NO PROCESSING | NO PROCESSING |
| TENTH PROCESSING | NO PROCESSING | NO PROCESSING | NO PROCESSING |
| ELEVENTH PROCESSING | NO PROCESSING | NO PROCESSING | NO PROCESSING |
| TWELFTH PROCESSING | NO PROCESSING | NO PROCESSING | NO PROCESSING |

FIG.32

| 1 | 5  | 1 |
|---|----|---|
| 5 | 25 | 5 |
| 1 | 5  | 1 |

ARITHMETIC DEVICE AND ARITHMETIC METHOD

CROSS-REFERENCE TO RELATED APPLICATIONS

This application is based upon and claims the benefit of priority from Japanese Patent Application No. 2019-118757, filed on Jun. 26, 2019; the entire contents of which are incorporated herein by reference.

FIELD

Embodiments described herein relate generally to an arithmetic device and an arithmetic method.

BACKGROUND

A method of executing convolution processing and matrix operation processing included in arithmetic operations of a neural network with the same arithmetic device is known. For example, in a proposed method, processes of a convolution arithmetic operation controller and processing of a fully connected arithmetic operation controller included in an arithmetic processing device are switched with a plurality of input switches and output switches.

However, prior art has the problem that the processing speed decreases in specific convolution processing and matrix operation processing. For example, prior art has the problem that the operation rate of a product-sum operator inside the arithmetic processing device decreases and the processing speed decreases in the case where the form of the filter is 1×1 and in specific processing, such as deconvolution.

BRIEF DESCRIPTION OF THE DRAWINGS

FIG. 4 is a diagram illustrating a configuration example of parameters set in the matrix operation unit;

FIG. 6 is a diagram illustrating examples of first processing to eighth processing;

FIG. 7 is a diagram illustrating processing allocation patterns for the first processing to the eighth processing;

FIG. 8 is a diagram illustrating an example of a pseudo-programming code of operation processing corresponding to WS;

FIG. 9 is a diagram illustrating an example of a pseudo-programming code of operation processing corresponding to OS1;

FIG. 10 is a diagram illustrating an example of a pseudo-programming code of operation processing corresponding to OS2;

FIG. 11 is a diagram illustrating definitions of variables and functions used in the pseudo-programming codes;

FIG. 13 is a diagram illustrating an example of the pseudo-programming code of operation processing corresponding to the WS;

FIG. 15 is a diagram illustrating an example of a processing order of a filter;

FIG. 29 is a diagram illustrating examples of parameters;

FIG. 30 is a diagram illustrating an example of processing allocation patterns;

FIG. 32 is a diagram illustrating a division example of convolution processing.

DETAILED DESCRIPTION

According to one embodiment, an arithmetic device includes storage, a controller, and operation circuitry. The storage stores therein P-dimensional input vectors, P×N-dimensional matrixes, N-dimensional intermediate value vectors, and N-dimensional output vectors, and is capable of executing, in parallel, two or more of reading processing of the input vector, reading processing of the matrix, reading processing of the intermediate value vector, and writing processing of the output vector. The controller sets read timings of a first input vector, a first matrix, and a first intermediate value vector, and write timing of a first output vector, in operation processing including a D-dimensional processing loop. The operation circuitry calculates product of the first input vector and the first matrix, calculates sum of the product and the first intermediate value vector, and stores the sum as the first output vector in the storage.

Preferred embodiments of the arithmetic device according to the present invention will be described hereinafter with reference to attached drawings.

An arithmetic device according to the present embodiment executes D-dimensional (D is an integer of 3 or more)

loop processing that can be controlled with parameters using storage storing data therein, a direct memory access (DMA) unit executing data transfer in the storage, a matrix operation unit executing arithmetic operations, and a controller executing setting of parameters and executing a processing instruction for the DMA unit and the matrix operation unit. This configuration enables execution of arithmetic operations executed in a neural network or the like with high efficiency (with low power consumption and at high speed).

The term "D-dimensional loop" (processing loop) means processing in which repeated processes nest D times. For example, a three-dimensional processing loop can also be referred to as threefold multiple loop (threefold loop). The following explanation will mainly illustrate an example of using a three-dimensional (D=3) processing loop, and illustrates an example of using a five-dimensional (D=5) processing loop, as a modification.

The following explanation will sometimes express the value of each of counters using coordinates including coordinate axes being change directions of the counters incremented in the respective dimensions of the D-dimensional processing loop. For example, coordinates (x,y,z) indicate coordinates in the case where x, y, and z are counters incremented in the respective dimensions of the three-dimensional processing loop and the change directions of the counters x, y, and z are an x axis (x direction), a y axis (y direction), and a z axis (z direction), respectively.

Figure 1:
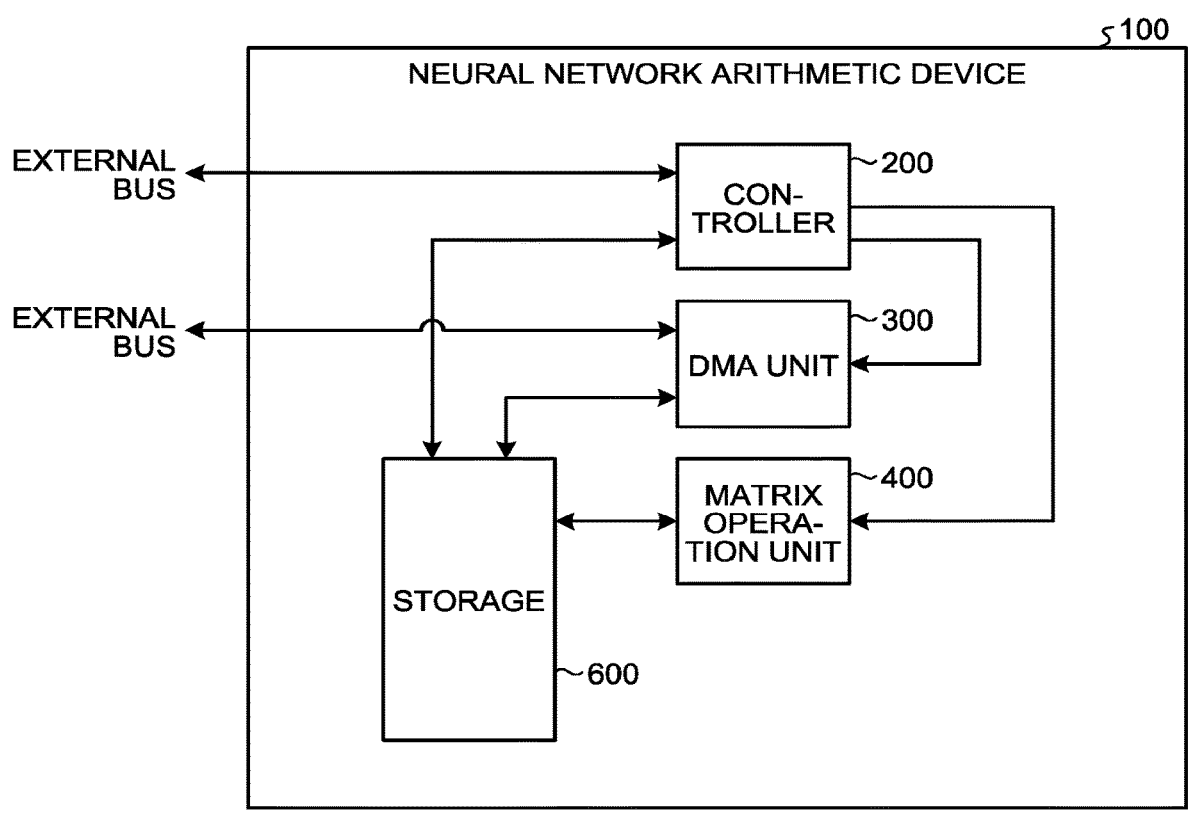
FIG. 1 is a block diagram of an arithmetic device according to an embodiment.

FIG. 1 is a block diagram illustrating a configuration example of an arithmetic device 100 according to the present embodiment. The arithmetic device 100 is, for example, a device executing arithmetic operations of a neural network, such as a convolutional neural network (CNN) and recurrent neural network (RNN), but the configuration is not limited thereto. The arithmetic device 100 may be achieved as another device executing operation processing including matrix operations.

As illustrated in FIG. 1, the arithmetic device 100 includes storage 600, a DMA unit 300, a matrix operation unit 400 (an example of operation circuitry), and a controller 200.

The storage 600 stores therein various data used for arithmetic operations. The storage 600 can be formed of any generally used storage medium, such as a flash memory and a random access memory (RAM).

Figure 2:
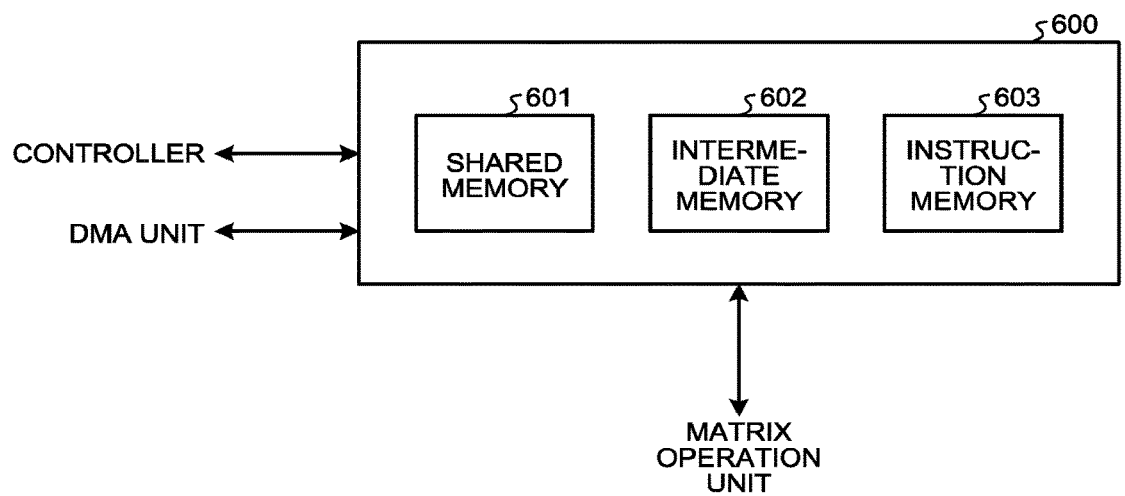
FIG. 2 is a block diagram of storage.

FIG. 2 is a block diagram illustrating a configuration example of the storage 600. The storage 600 includes a shared memory 601, an intermediate memory 602, and an instruction memory 603. Different address spaces in the physically same memory may be allocated to two or more memories in the shared memory 601, the intermediate memory 602, and the instruction memory 603.

The instruction memory 603 stores therein program codes achieving functions of the controller 200. The controller 200 reads the program codes stored in the instruction memory 603, and executes parameter setting and process instructions for the matrix operation unit 400 and the DMA unit 300 in accordance with the read program codes. The shared memory 601 stores therein SRC vectors and weight matrixes. The intermediate memory 602 stores therein DST vectors (OUT vectors).

SRC vectors are data (an example of input vectors) having the vector form and input to the matrix operation unit 400 as the target of arithmetic operations. Weight matrixes are data having the matrix form and input to the matrix operation unit 400 as data to be multiplied by SRC vectors. DST vectors are data (an example of intermediate value vectors) having the vector form and indicating results of arithmetic operations executed with the matrix operation unit 400. The DST vectors may be used for addition processing (sum operations) for the result of arithmetic operation of the next processing loop. For this reason, the intermediate memory 602 stores DST vectors therein. The DST vectors may be output as final arithmetic operation results. The DST vectors output as final arithmetic operation results may also be referred to as "OUT vectors" (an example of the output vectors).

With reference to FIG. 1 again, the DMA unit 300 executes data transfer between the memories in the storage 600. For example, the DMA unit 300 controls data movement from the shared memory 601 to the intermediate memory 602, and data movement from the intermediate memory 602 to the shared memory 601.

The matrix operation unit 400 executes operation processing in accordance with a processing instruction from the controller 200. The controller 200 executes parameter setting and processing instruction for the DMA unit 300 and the matrix operation unit 400. For example, in operation processing including a D-dimensional processing loop, the controller 200 controls addresses of each piece of data (SRC vector (first input vector), weight matrix (first matrix), and DST (first intermediate value vector)) read from the storage 600, read timing of each piece of data, addresses of data (OUT vector (first output vector)) to be written to the storage 600, and write timing of the data to be written, by parameter setting and processing instructions.

For example, the matrix operation unit 400 calculates the product of the SRC vector and the weight matrix read from the storage 600 in accordance with the read timings set with the controller 200, calculates the sum of the DST vector read from the storage 600 in accordance with the set read timing and the product acquired by the arithmetic operation, and stores the calculated sum as the OUT vector in the storage 600 at the set write timing. The details of the functions of the matrix operation unit 400 and the controller 200 will be described later.

As illustrated in FIG. 1, the controller 200 and the DMA unit 300 may be connected with external devices and memories via external buses.

The controller 200 may be achieved, for example, as a central processor unit (CPU) including dedicated instruction sets for the DMA unit 300 and the matrix operation unit 400. The DMA unit 300 and the matrix operation unit 400 may be achieved as individual independent hardware circuits, a united hardware circuit, or the like. Part or all of the controller 200, the DMA unit 300, and the matrix operation unit 400 may be achieved with a physically united hardware circuit.

Figure 3:
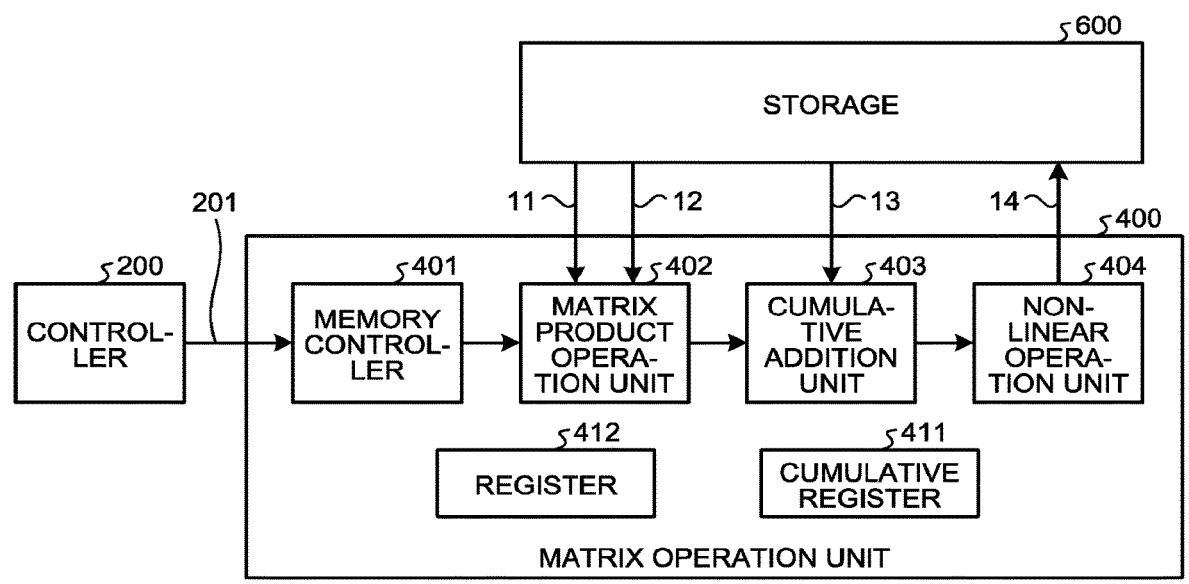
FIG. 3 is a block diagram illustrating a detailed configuration of a matrix operation unit.

FIG. 3 is a block diagram illustrating an example of a detailed configuration of the matrix operation unit 400. The matrix operation unit 400 executes processing in accordance with the parameter setting and a processing instruction 201 from the controller 200. The matrix operation unit 400 includes a memory controller 401, a matrix product operation unit 402, a cumulative addition unit 403, a nonlinear operation unit 404, a cumulative register 411, and a register 412.

The memory controller 401 controls reading of data from the storage 600 and writing of data to the storage 600. The matrix product operation unit 402 calculates the matrix product of a weight matrix 11 and an SRC vector 12 read from the storage 600. The cumulative addition unit 403 executes addition of the output vector serving as a result of the operation executed with the matrix product operation unit 402 and a DST vector 13 read from the storage 600 or a vector stored in the cumulative register 411.

The nonlinear operation unit 404 applies nonlinear operation to the output vector serving as a result of the operation executed with the cumulative addition unit 403, and writes the output vector serving as an operation result thereof to the storage 600 as an OUT vector 14. The nonlinear operation is, for example, an arithmetic operation to which an activation function is applied and an arithmetic operation, such as quantization, or may be an arithmetic operation acquired by pipelining a plurality of processes. As another example, the nonlinear operation unit 404 may include a function of switching a plurality of nonlinear operations using parameter setting.

The cumulative register 411 is a register storing therein data used for arithmetic operations (addition) executed with the cumulative addition unit 403. An initial value (for example, zero) of the cumulative value, or a value read from the storage 600 is stored in the cumulative register 411.

The value stored (substituted) in the cumulative register 411 may be a bias value (corresponding to a value that cannot be absorbed into convolution processing) in the case where batch normalization processing is absorbed into convolution processing by prior optimization and an operation result of another arithmetic operation in the case where the operation result of another arithmetic operation is added to the operation result acquired with the matrix operation unit 400.

The register 412 is a register to store therein parameters to be set for the DMA unit 300 and the matrix operation unit 400. The details of parameters stored in the register 412 will be described later.

The cumulative register 411 and the register 412 may be provided outside the matrix operation unit 400. As another example, another storage device, such as the storage 600 may be used instead of part or all of the cumulative register 411 and the register 412.

With the configuration described above, the matrix operation unit 400 is enabled to execute various convolutions and fully connected layer processing (corresponding to processing of the fully connected layer of the neural network) in accordance with operands of the parameter setting and the processing instructions from the controller 200. The following is an explanation of details of the functions of the matrix operation unit 400 and the controller 200.

Supposing that the size of the SRC vector is 1×P (a P-dimensional vector) and the size of the weight matrix is P×N, the size of each of a DST vector and an OUT vector is 1×N (an N-dimensional vector). P is an integer of 2 or more and determined, for example, in accordance with the size of the unit of storage (word) of the shared memory 601. N is an integer of 2 or more and determined, for example, in accordance with the size of the unit of storage of the intermediate memory 602.

For example, the SRC vector is a vector corresponding to an element "(horizontal width, vertical width, number of channels)=(1,1,P)" serving as part of a feature map. The feature map is, for example, data serving as input of processing with convoluted layers of a CNN. For example, a feature map may be two-dimensional image data (such as data including pixel values of each of R, G, and B channels for respective pixels in the horizontal direction and the vertical direction) and data serving as a result of an arithmetic operation of two-dimensional image data with a convoluted layer of the previous stage.

The size "(horizontal width, vertical width, number of channels)=(X,Y,Z×P)" of the feature map is, for example, (7,7,4×P). In the feature map, information acquired by extracting the part of "horizontal width=1, vertical width=1, number of channels=P" serves as a P-dimensional vector. An SRC vector is a vector corresponding to the element of part of such a feature map. In the following explanation, the size of the vector may also be expressed as "(horizontal width, vertical width, number of channels)=(1,1,P)" to correspond to the expression "(horizontal width, vertical width, number of channels)" serving as the expression of the size of the feature map.

X, Y, and Z can be regarded as the processing sizes in the x direction, the y direction, and the z direction, respectively. The processing size corresponds to, for example, a maximum value of the counter of the processing loop of each dimension. For example, processing is executed in units of one element in the horizontal direction and the vertical direction of the feature map. Accordingly, the processing sizes in the x direction and the y direction agree with the horizontal width and the vertical width (each of which is 7 in the example described above) of the feature map. In the channel direction, for example, because a P-dimensional SRC vector serves as the processing unit, the processing size Z in the channel direction is "number of channels/P=4".

The weight matrix is a P×N-dimensional matrix acquired by extracting and arranging part of the convolutional filter. In other words, the weight matrix is a matrix in which the number of input channels is P and the number of output channels is N. When it is expressed to correspond to the expression of the size of the feature map, the weight matrix can also be regarded as a matrix of "(horizontal width, vertical width, number of input channels, number of output channels)=(1,1,P,N)".

A DST vector is an N-dimensional vector, that is, a vector with the number of channels of N. When it is expressed to correspond to the expression of the size of the feature map, the DST vector can also be regarded as a matrix of "(horizontal width, vertical width, number of channels)=(1,1,N)".

The matrix operation unit 400 can be regarded as executing the following arithmetic operation for one processing instruction. The timings of reading and writing of each of vectors and matrixes and presence/absence of application of a nonlinear function (nonlinear operation) are controlled with parameters.

OUT vector=nonlinear function(SRC vector×weight matrix+DST vector)

FIG. 4 is a diagram illustrating a configuration example of parameters set in the matrix operation unit 400. The parameters can be classified into parameters set in the register 412 and parameters set as operands of the processing instruction. The classification method illustrated in FIG. 4 is an example, and any other classification method may be applied. For example, all the parameters may be set in the register 412, or all the parameters may be set as operands.

Parameters enable control of the range of the addresses of data to be processed, the processing order of data, and the timing of execution of processing. Specifically, the matrix operation unit 400 is capable of executing one or more product-sum operations using data of the designated range, as well as calculating one matrix product, with one processing instruction in accordance with the parameters illustrated in FIG. 4.

When the definitions in FIG. 4 are used, the read address (wadr) of the weight matrix, the read address (sadr) of the SRC vector, and the read address of the DST vector in the coordinates (x,y,z) in a three-dimensional processing loop can be expressed, for example, as in the following Expressions (1), (2), and (3), respectively. In this example, the read address of the DST vector is regarded as the write address of the OUT vector, but they may be defined independently.

$$wadr=wadr0+wadr\_offset+x\Delta wx+y\Delta wy+z\Delta wz \quad (1)$$

$$sadr=sadr0+sadr\_offset+x\Delta sx+y\Delta sy+z\Delta sz \quad (2)$$

$$dadr=dadr0+dadr\_offset+x\Delta dx+y\Delta dy+z\Delta dz \quad (3)$$

Figure 5:
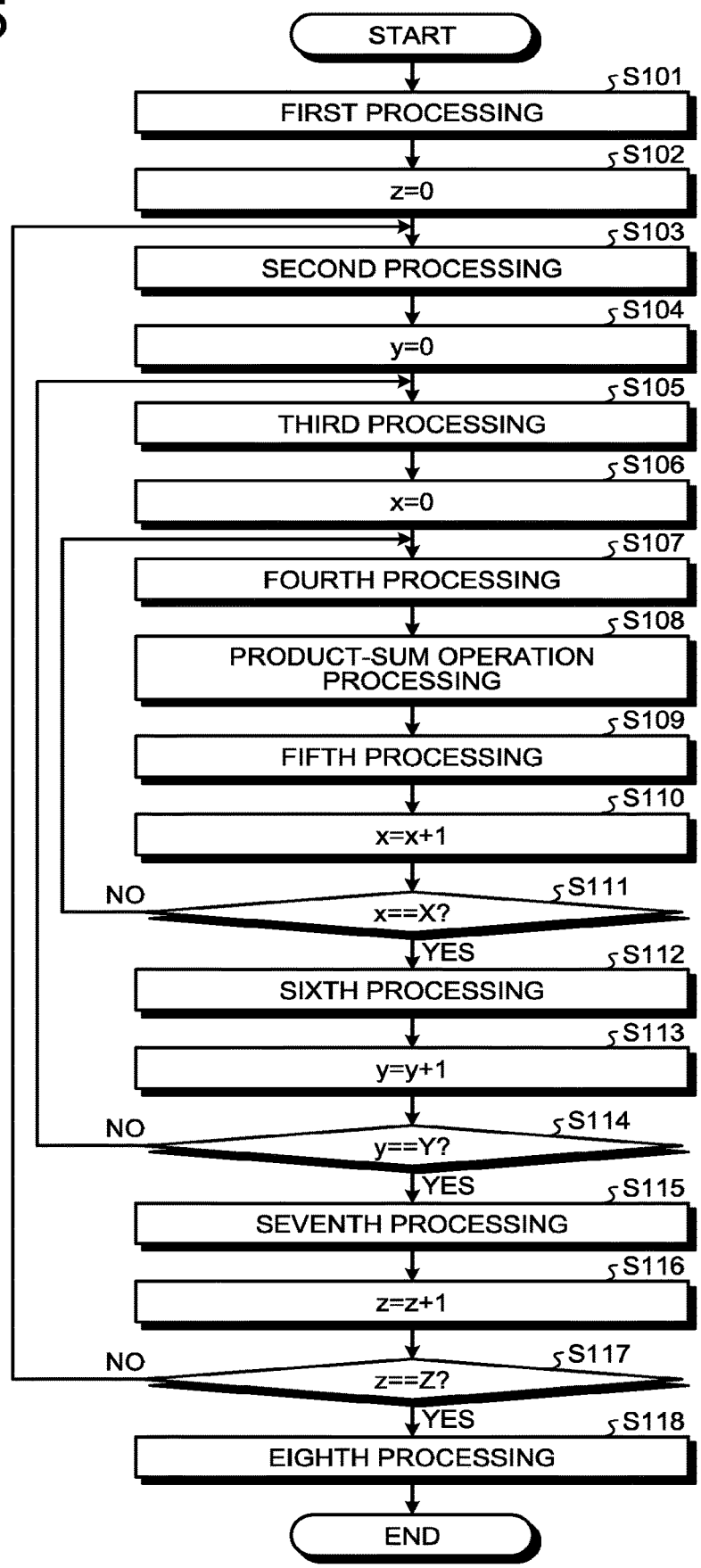
FIG. 5 is a flowchart of matrix operation processing executed in the matrix operation unit.

FIG. 5 is a flowchart illustrating an example of matrix operation processing executed with the matrix operation unit 400 for one processing instruction. As illustrated in FIG. 5, matrix operation processing is threefold loop processing corresponding to the x direction, the y direction, and the z direction. For example, the x direction, the y direction, and the z direction correspond to the horizontal direction, the vertical direction, and the channel direction of the feature map, respectively.

The matrix operation unit 400 starts matrix operation processing in accordance with a processing instruction from the controller 200. The first processing to the eighth processing (Step S101, Step S103, Step S105, Step S107, Step S109, Step S112, Step S115, and Step S118) are executed in the case where processing at each timing is designated. Specific examples of the first processing to the eighth processing will be described later.

The matrix operation unit 400 initializes the corresponding variable before each loop of the three-dimensional loop. For example, the matrix operation unit 400 initializes z, y, and x, that is, "z=0" (Step S102), "y=0" (Step S104), and "x=0" (Step S106).

In the innermost loop, the matrix product operation unit 402 and the cumulative addition unit 403 execute the product-sum operation processing (Step S108). For example, the matrix product operation unit 402 calculates the matrix product of the weight matrix and the SRC vector read from the storage 600 at the past processing. The cumulative addition unit 403 adds the output vector serving as an operation result acquired with the matrix product operation unit 402 and the DST vector read from the storage 600 or the vector stored in the cumulative register 411.

When processing in each loop is finished, the matrix operation unit 400 adds 1 to the corresponding counter (x, y, or z) (Step S110, Step S113, or Step S116). The matrix operation unit 400 also determines whether the counter satisfies the finish condition.

For example, the matrix operation unit 400 determines whether the counter x of the innermost processing loop has reached X (corresponding to the processing size in the x direction) (Step S111). When the counter x has not reached X (No at Step S111), the matrix operation unit 400 returns to Step S107 to repeat the processing. When the counter x has reached X (Yes at Step S111), the matrix operation unit 400 executes the processing at Step S112 and subsequent steps.

The matrix operation unit 400 determines whether the counter y in the middle processing loop has reached Y (corresponding to the processing size in the y direction) (Step S114). When the counter y has not reached Y (No at Step S114), the matrix operation unit 400 returns to Step S105 to repeat the processing. When the counter y has reached Y (Yes at Step S114), the matrix operation unit 400 executes the processing at Step S115 and subsequent steps.

The matrix operation unit 400 determines whether the counter z in the outermost processing loop has reached Z (corresponding to the processing size in the z direction) (Step S117). When the counter z has not reached Z (No at Step S117), the matrix operation unit 400 returns to Step S103 to repeat the processing. When the counter z has reached Z (Yes at Step S117), the matrix operation unit 400 executes the processing at Step S118 and subsequent steps.

FIG. 6 is a diagram illustrating examples of the first processing to the eighth processing. The four processes in FIG. 6, that is, weight processing, SRC processing, DST processing, and OUT processing, are executed at any of timings of the first processing to the eighth processing in FIG. 4. Each of the first processing to the eighth processing may include two or more of the four processes in FIG. 6.

The initial conditions illustrated in FIG. 6 are, for example, conditions for determining whether to read the initial value of the cumulative value from the cumulative register 411. Configuration examples of the initial conditions are illustrated in the following examples (INIT1) to (INIT4). The configuration may further include a parameter to enable selection of the initial condition to be applied from the initial conditions as follows. Only part of the following initial conditions may be applied. As another example, the initial condition in which part or all of the variables x, y, and z in the following initial conditions is not used may be applied. The conditions "init_cond_x", "init_cond_y", and "init_cond_z" can be regarded as conditions limiting the range of data to which the processing executed when the initial conditions are satisfied is applied.

(INIT1):
init_condition(init_flag, x, y, z)=(init_flag==1)&
(($x \leq$init_cond_x)&($y \leq$init_cond_y)&($z \leq$init_cond_z)
(INIT2):
init_condition(init_flag,x,y,z)=(init_flag==1)&
(($x \leq$init_cond_x)|($y \leq$init_cond_y)|($z \leq$init_cond_z)
(INIT3):
init_condition (init_flag, x, y, z)=(init_flag==1)&
(($x \geq$init_cond_x)&($y \geq$init_cond_y)&($z \geq$init_cond_z)
(INIT4):
init_condition (init_flag, x, y, z)=(init_flag==1)&
(($x \geq$init_cond_x)|($y \geq$init_cond_y)|($z \geq$init_cond_z)

The last conditions illustrated in FIG. 6 are, for example, conditions for determining whether to execute a nonlinear operation for the output vector (OUT vector). Configuration examples of the last conditions are illustrated in the following "LAST1" to "LAST4". The configuration may further include a parameter to enable selection of the last condition to be applied from the last conditions as follows. Only part of the following last conditions may be applied. As another example, the last condition in which part or all of the variables x, y, and z in the following last conditions is not used may be applied. The conditions "last_cond_x", "last_cond_y", and "last_cond_z" can be regarded as conditions limiting the range of data to which the processing (such as a nonlinear operation) executed when the last conditions are satisfied is applied.

(LAST1)
last_condition (last_flag, x, y, z)=(last_flag==1)&
(($x \leq$last_cond_x)&($y \leq$last_cond_y)&($z \leq$last_cond_z)
(LAST2):
last_condition (last_flag, x, y, z)=(last_flag==1)&
(($x \leq$last_cond_x)|($y \leq$last_cond_y)|($z \leq$last_cond_z)
(LAST3):
last_condition (last_flag,x,y,z)=(last_flag==1)&
(($x \geq$last_cond_x)&($y \geq$last_cond_y)&($z \geq$last_cond_z)
(LAST4):
last_condition (last_flag, x, y, z)=(last_flag==1)&
(($x \geq$last_cond_x)|($y \geq$last_cond_y)|($z \geq$last_cond_z)

FIG. 7 is a diagram illustrating an example of processing allocation patterns (scheduling) of the processing (processes in FIG. 6) for the first processing to the eighth processing. The data serving as the target of the matrix operation processing and the timing of the processing can be changed according to whether any processing is allocated to each of the first processing to the eighth processing and what processing is allocated thereto.

The scheduling includes weight stationary (WS), output stationary (OS) 1, and OS2. WS is setting to mainly execute two-dimensional convolution processing by a WS algorithm. OS1 is setting to mainly execute two-dimensional convolution processing by an OS algorithm. OS2 is setting to mainly execute fully connected layer processing, that is, calculate the product of the vector and the matrix.

Generally, two-dimensional convolution processing can be achieved by combining a plurality of processing instructions (scheduling) with parameters changed. Any combination other than that of FIG. 7 may be used.

FIG. 8 is a diagram illustrating an example of a pseudo-programming code of operation processing corresponding to the WS. FIG. 9 is a diagram illustrating an example of a pseudo-programming code of operation processing corresponding to the OS1. FIG. 10 is a diagram illustrating an example of a pseudo-programming code of operation processing corresponding to the OS2. FIG. 11 is a diagram illustrating definitions of variables and functions used in the pseudo-programming codes from FIG. 8 to FIG. 10.

Figure 12A:
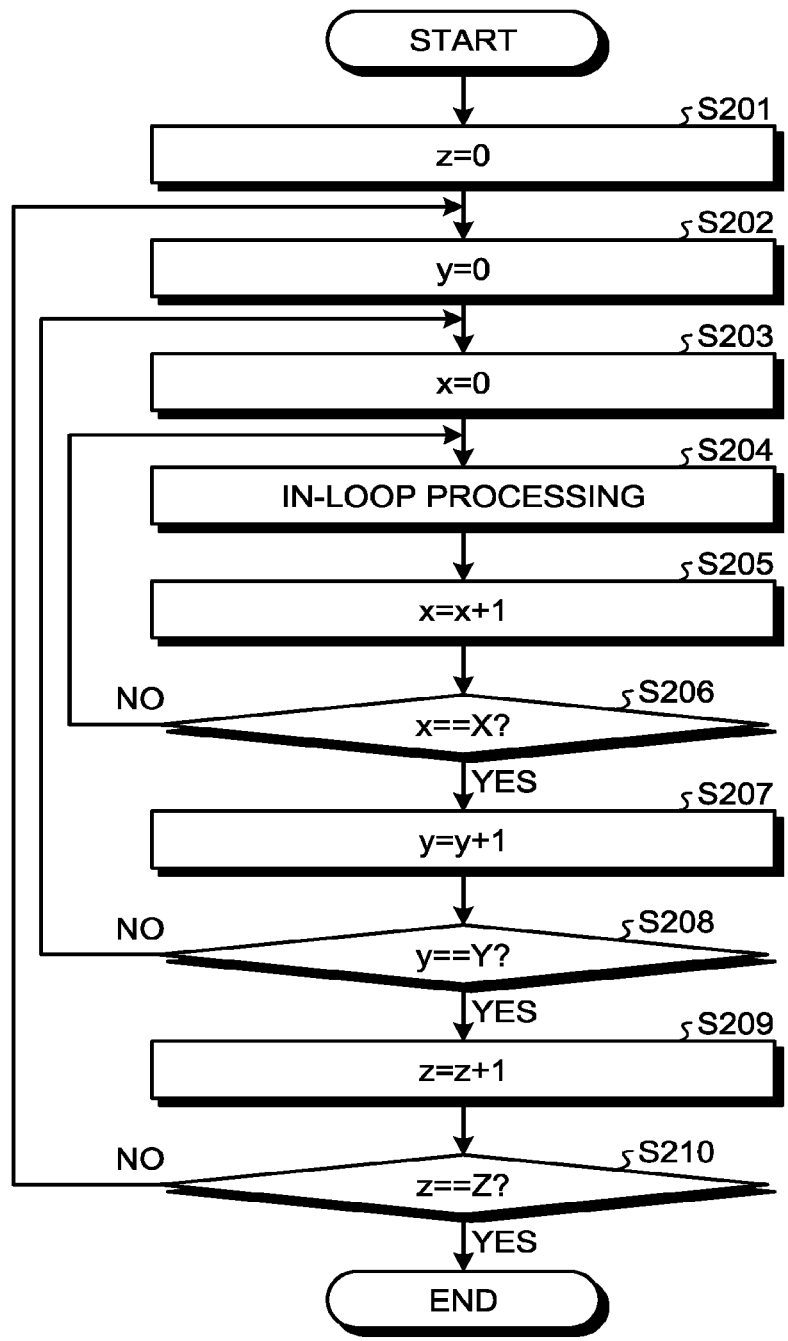
FIG. 12A is a flowchart illustrating another example of the matrix operation processing.
Figure 12B:
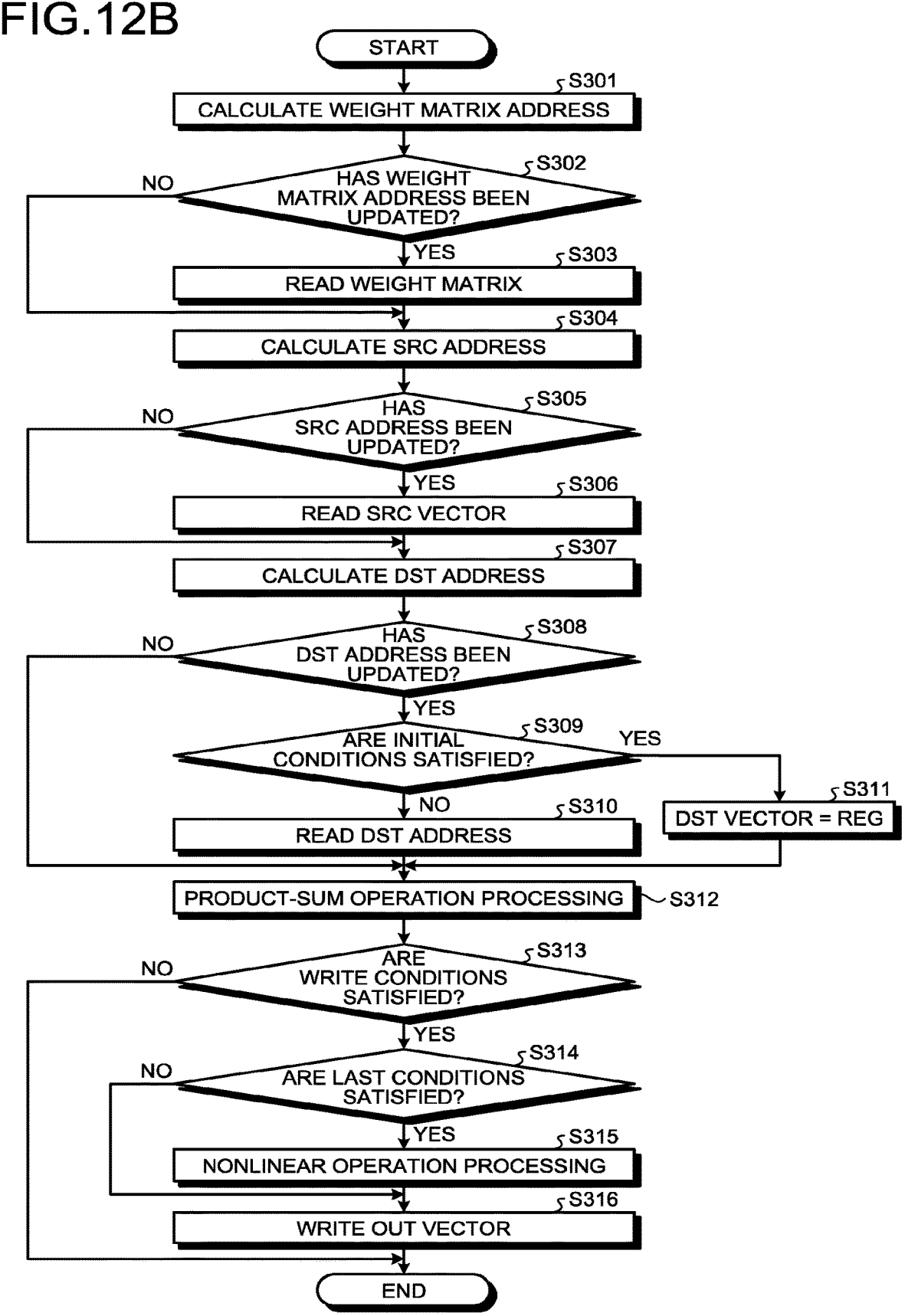
FIG. 12B is a diagram illustrating another example of the matrix operation processing.

Examples of the matrix operation processing executed with the matrix operation unit 400 for one processing instruction is not limited to the example in FIG. 5. FIG. 12A and FIG. 12B are flowcharts illustrating another example of the matrix operation processing. They are different from the flowchart of FIG. 5 in that a determination condition to determine whether to execute each processing is added, instead of changing the timing of allocating each processing (weight processing, SRC processing, DST processing, and OUT processing) in FIG. 6.

First, the matrix operation unit 400 initializes each of the counters, that is, "z=0", "y=0", and "x=0" (Step S201, Step S202, and Step S203). The matrix operation unit 400 executes in-loop processing in the innermost loop (Step S204). The in-loop processing will be explained with reference to FIG. 12B.

When the processing in the innermost loop is finished, the matrix operation unit 400 adds 1 to the corresponding counter x (Step S205). The matrix operation unit 400 also determines whether the counter x satisfies the finish condition (Step S206). When the counter x fails to satisfy the finish condition (No at Step S206), the matrix operation unit 400 returns to Step S204 to repeat the processing. When the counter x satisfies the finish condition (Yes at Step S206), the matrix operation unit 400 executes the processing at Step S207 and subsequent steps.

The matrix operation unit 400 adds 1 to the counter y of the middle processing loop (Step S207). The matrix operation unit 400 also determines whether the counter y satisfies the finish condition (Step S208). When the counter y fails to satisfy the finish condition (No at Step S208), the matrix operation unit 400 returns to Step S203 to repeat the processing. When the counter y satisfies the finish condition (Yes at Step S208), the matrix operation unit 400 executes the processing at Step S209 and subsequent steps.

The matrix operation unit 400 adds 1 to the counter z of the outermost processing loop (Step S209). The matrix operation unit 400 also determines whether the counter z satisfies the finish condition (Step S210). When the counter z fails to satisfy the finish condition (No at Step S210), the matrix operation unit 400 returns to Step S202 to repeat the processing. When the counter z satisfies the finish condition (Yes at Step S210), the matrix operation processing is ended.

The following is an explanation of the in-loop processing at Step S204 with reference to FIG. 12B.

The matrix operation unit 400 calculates the address of the weight matrix (Step S301). The matrix operation unit 400 determines whether the address of the weight matrix has been updated (Step S302). When the address has been updated (Yes at Step S302), the matrix operation unit 400 reads the weight matrix from the updated address (Step S303). When the address of the weight matrix has not been updated (No at Step S302) or after the weight matrix is read, the matrix operation unit 400 calculates the address (SRC address) of the SRC vector (Step S304).

The matrix operation unit 400 determines whether the SRC address has been updated (Step S305). When the SRC address has been updated (Yes at Step S305), the matrix operation unit 400 reads the SRC vector from the updated address (Step S306). When the SRC address has not been updated (No at Step S305) or after the SRC vector is read, the matrix operation unit 400 calculates the address (DST address) of the DST vector (Step S307).

The matrix operation unit 400 determines whether the DST address has been updated (Step S308). When the DST address has been updated (Yes at Step S308), the matrix operation unit 400 determines whether the initial conditions are satisfied (Step S309). When the initial conditions are not satisfied (No at Step S309), the matrix operation unit 400 reads the DST vector from the updated address (Step S310). When the initial conditions are satisfied (Yes at Step S309), the matrix operation unit 400 reads the value of the cumulative register (REG), and sets the value as the value of the DST vector (Step S311).

When the DST address has not been updated or after the DST vector is read, the matrix operation unit 400 executes the product-sum operation processing (Step S312). The product-sum operation processing is the same as the processing at Step S108 of FIG. 5.

The matrix operation unit 400 determines whether the write conditions are satisfied (Step S313). When the write conditions are satisfied (Yes at Step S313), the matrix operation unit 400 determines whether the last conditions are satisfied (Step S314). When the last conditions are satisfied (Yes at Step S314), the matrix operation unit 400 executes nonlinear operation processing for the operation result of the product-sum operation processing (Step S315).

When the last conditions are not satisfied (No at Step S314) or after the nonlinear operation processing is executed, the matrix operation unit 400 writes the operation result of the processing executed up to the present step as the OUT vector in the storage 600 (Step S316).

When the write conditions are not satisfied (No at Step S313) or after the OUT vector is written, the in-loop processing is ended.

As described above, in the example of FIG. 12A and FIG. 12B, reading of the weight matrix is executed when the address of the weight matrix has been updated, reading of the SRC vector is executed when the SRC address has been updated, and reading of the DST vector is executed when the DST address has been updated. This example also achieves a threefold processing loop like the flowchart of FIG. 5, and can achieve the same function as that of FIG. 5.

FIG. 13 is a diagram illustrating an example of a pseudo-programming code of the operation processing corresponding to the WS in the case where the processing is executed in accordance with the flowcharts of FIG. 12A and FIG. 12B. As illustrated with the symbol "*" in FIG. 13, processing that is substantially the same as that of FIG. 5 can be achieved by controlling the three-dimensional increment quantity of each address and determining whether the address has been updated.

The first method for determining whether each of addresses of the weight matrix, the SRC vector, and the DST vector has been updated at Step S302, Step S305, and Step S308 in FIG. 12B is a method of storing the past address values in the register, and comparing the past address value with a newly calculated address. In this case, in the initial processing, it is regarded that the address value has been updated, in principle.

The second method for determining whether the address has been updated is a method of executing determination on the basis of whether the increment value (Δwx, Δwy, Δwz, Δsx, Δsy, Δsz, Δdx, Δdy, or Δdz) of the three-dimensional address is not zero and whether the counter has been incremented. Specifically, the matrix operation unit 400 determines that the corresponding address has been updated when x has been incremented, in the case where the increment value (Δwx, Δsx, or Δdx) in the x direction is not zero. The matrix operation unit 400 determines that the corresponding address has been updated when y has been incremented, in the case where the increment value (Δwy, Δsy, or Δdy) in the y direction is not zero. The matrix operation unit 400 determines that the corresponding address has been updated when z has been incremented, in the case where the increment value (Δwz, Δsz, or Δdz) in the z direction is not zero. The increment values (Δwx, Δwy, Δwz, Δsx, Δsy, Δsz, Δdx, Δdy, and Δdz) of the three-dimensional address can be regarded as parameters to determine whether the corresponding address value is to be updated in the processing loop. Also in this case, in the initial processing, it is regarded that the address value has been updated, in principle.

Determination as to whether the write conditions are satisfied at Step S313 in FIG. 12B can be executed in association with the timing at which the DST address has been updated. The first method for determining whether the write conditions are satisfied can be expressed as follows using whether the increment value of the three-dimensional address is not zero and whether each dimension of the three-dimensional address has a maximum value.

First method for determining whether the write conditions are satisfied:

(Δdx!=0)|
(Δdx=0&Δdy!=0&x=X−1)|
(Δdx=0&Δdy=0&Δdz!=0&x=X−1&y=Y−1)|
(Δdx=0&Δdy=0&Δdz=0&x=X−1&y=Y−1&z=Z−1)

As described above, one matrix operation processing or a combination of a plurality of matrix operation processing (FIG. 5 or FIG. 12A and FIG. 12B) can achieve two-dimensional convolution processing corresponding to, for example, an arithmetic operation of a convolution layer of CNN and processing corresponding to an arithmetic operation of the fully connected layer. The following is an explanation of an example of two-dimensional convolution processing and fully connected layer processing.

Figure 14:
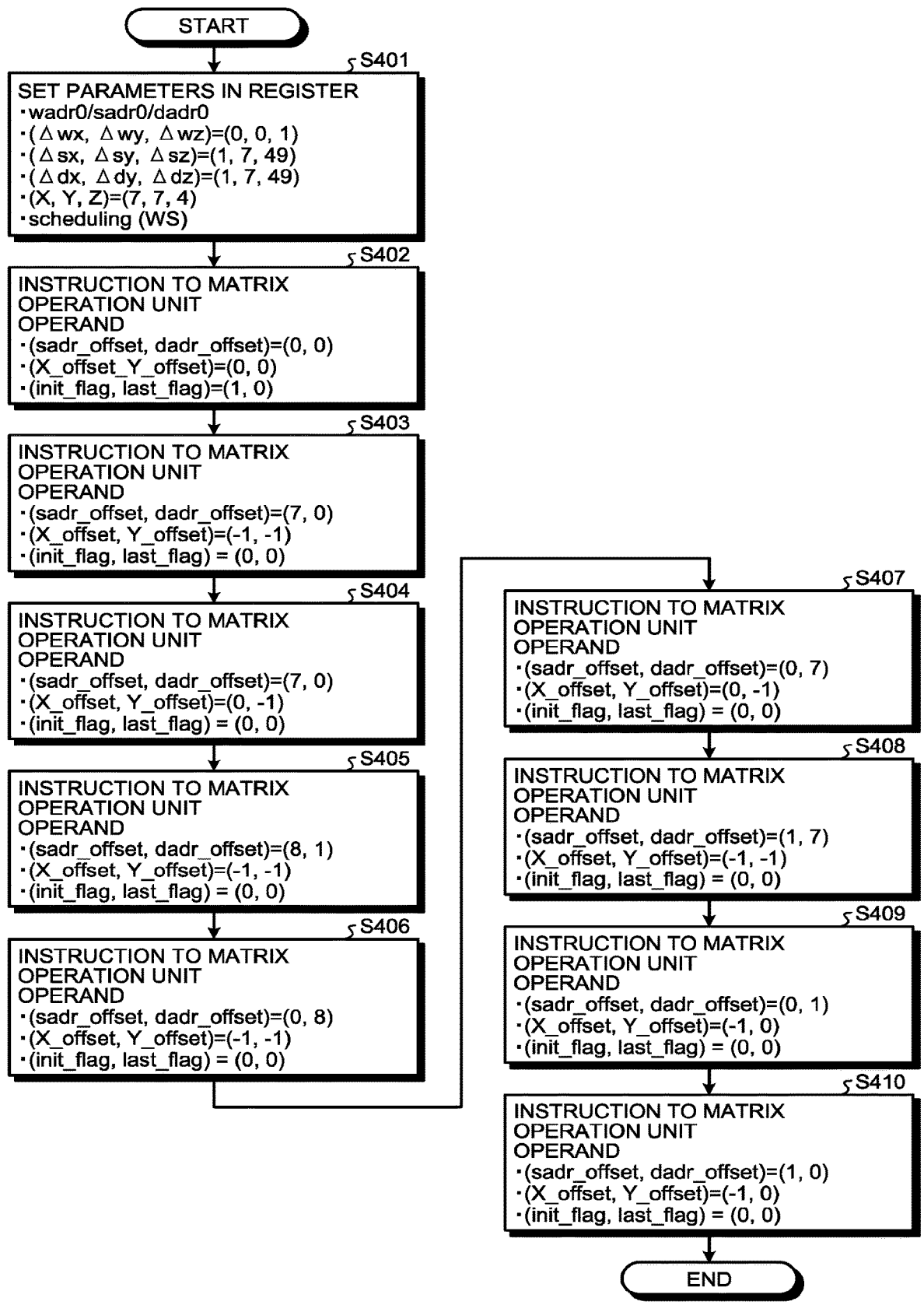
FIG. 14 is a flowchart of two-dimensional convolution processing executed with a matrix operation unit.

FIG. 14 is an example of a flowchart of two-dimensional convolution processing executed with the matrix operation unit 400. Two-dimensional convolution processing is processing to execute convolution in which a convolution filter is slid in two-dimensional directions, for example, in the horizontal direction and the vertical direction of the feature map. FIG. 14 illustrates the case of using a 3×3 convolution filter (3×3 filter) having each of the horizontal size and the vertical size of 3. More specifically, in the example of FIG. 14, the parameters of convolution are "(stride in the x direction, stride in the y direction)=(1,1)", "(upper padding size, lower padding size, left padding size, right padding size)=(1,1,1,1)", and "(filter size in the x direction, filter size in the y direction)=(3,3)".

Step S401 corresponds to processing in which the controller 200 sets parameters in the register. For example, the controller 200 sets the base values (reference values) of the start addresses of the weight matrix, the SRC vector, and the DST vector for wadr0, sadr0, and dadr0, respectively. The three-dimensional increment value of the address and the base value (reference value) of the three-dimensional processing size are set to values as illustrated in Step S401 of FIG. 14. The symbol "scheduling (WS)" means, for example, applying the scheduling of the WS in the scheduling (allocation patterns) of FIG. 7. Although not illustrated in FIG. 14, the initial conditions and the last conditions may be set at Step S401.

Each of the instructions illustrated at Step S402 to Step S410 corresponds to the matrix operation processing illustrated in FIG. 5 or FIG. 12A and FIG. 12B. For example, at Step S402, the controller 200 issues a processing instruction including the operands as illustrated in FIG. 14, and causes the matrix operation unit 400 to execute the processing in accordance with the processing instruction. Step S402 corresponds to convolution processing for the center pixel of the filter. The reason why the processing is started from the center pixel is that initialization (such as processing of reading the corresponding initial value from the cumulative register 411) can be executed with an instruction because operation processing for the whole elements in the x direction and the y direction is executed.

In the case where the processing is not started from processing on the center pixel, it is required to set, with two or more steps, initial conditions to limit the range of the elements to which the initialization processing is applied in any of the dimensions. For example, by properly setting the initial conditions "init_cond_x", "init_cond_y", and "init_cond_z" as illustrated in (INIT1) to (INIT4) as described above, it is possible to set the range of the elements of each dimension to which the initial conditions are applied by dividing (preventing overlapping) setting into two or more steps.

At each of Step S403 and subsequent steps, by changing operands, such as the offset of the address, the offset of the processing size, the initial flag, and the last flag, it is possible to execute desired matrix operation processing.

As illustrated in FIG. 14, two-dimensional convolution processing with application of a 3×3 filter can be achieved with nine matrix operation processes corresponding to nine processing instructions (Step S402 to Step S410). When the size of the convolution filter is changed, two-dimensional convolution processing is achieved with matrix operation processes of number of times corresponding to the size of the convolution filter.

Figure 15:
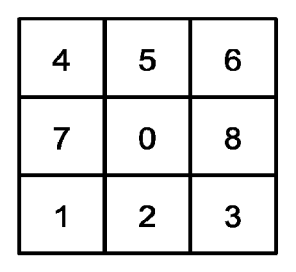

FIG. 15 is a diagram illustrating an example of the processing order of the filter in the two-dimensional convolution processing illustrated in FIG. 14. The numbers in FIG. 15 indicate the processing order. Specifically, the numbers mean that the processing is executed in order from the element with the smallest number. The symbols "w0" to "w35" mean that the weight in each filter is applied in the order of the numbers assigned after the symbol "w". Each of the rectangles provided with a number (0 to 195) and weight (w0 to w35) corresponds to a vector of 1×P or a vector of 1×N. The matrix of P×N acquired by extracting N kernels of weight provided with the same number corresponds to the weight matrix. For the sake of convenience of explanation, although the same symbol (such as w0) is assigned to the weights of the N (for N kernels) filters arranged in the right direction, this does not mean that the values of the weights are the same, but merely means that the application order is the same.

Figure 16:
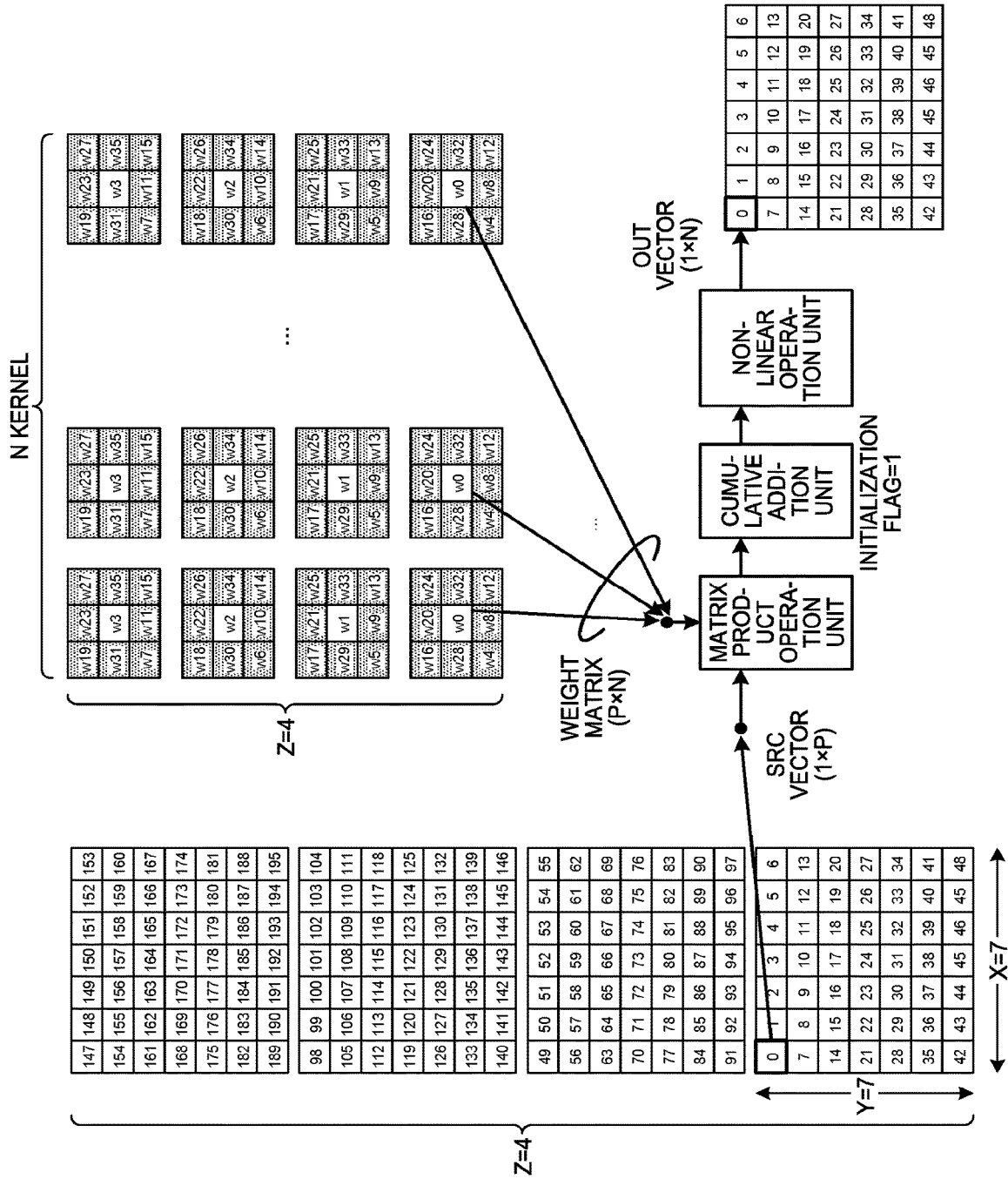
FIG. 16 is a diagram illustrating an example of processing at Step S402 in FIG. 14.

FIG. 16 is a diagram illustrating an example of the processing at Step S402 of FIG. 14. In the example of FIG. 16, the size (X,Y,Z×P) of the feature map satisfies "(X,Y, Z×P)=(horizontal width, vertical width, number of channels)=(7,7,4×P). In addition, the SRC vector corresponding to the feature map input to the matrix product operation unit 402 is a 1×P vector corresponding to "(horizontal width, vertical width, number of channels)=(1,1,P)". The weight matrix is a P×N matrix with "(horizontal width, vertical width, number of input channels, number of output channels)=(1,1,P,N)".

The form of one word data stored in the shared memory 601 is a vector including the element in the channel direction in principle, and serves as an element unit (pixel unit in the case of an image) with "horizontal width=vertical width=1". In the processing of FIG. 16, a product-sum operation is executed for the center pixel of the filter and all the pixels of the same channel of the feature map. As a result, a DST vector with "(horizontal width, vertical width, number of channels)=(1,1,N)" is calculated.

Specifically, the matrix products of the weight matrix corresponding to w0 and 49 SRC vectors corresponding to the numbers of 0 to 48 are calculated, the 49 matrix products are successively added, with the value of the cumulative register 411 serving as the initial value, and the addition result is written in the intermediate memory 602. Thereafter, the matrix products of the weight matrix corresponding to w1 and 49 SRC vectors corresponding to the numbers of 49 to 97 are calculated, the 49 matrix products are successively added to the calculation result for w0 read as the DST vector from the intermediate memory 602, and the addition result is written to the intermediate memory 602 again.

Calculation of matrix products and cumulative addition are executed in the same manner also for the weight matrix corresponding to w2 and 49 SRC vectors corresponding to the numbers of 98 to 146, and the weight matrix corresponding to w3 and 49 SRC vectors corresponding to numbers of 147 to 195. By the processing at Step S402, processing corresponding to one pixel of the 3×3 filter in convolution processing is finished.

As described above, the numbers following "w" in the filter mean the processing order, and agree with the reading order. Generally, because data of the filter can be prepared in advance, setting the order of storing data in the shared memory 601 to a desired order can be easily achieved. Accordingly, the address in access to the weight matrix is sufficient by simple 1 increment in many cases.

Figure 17:
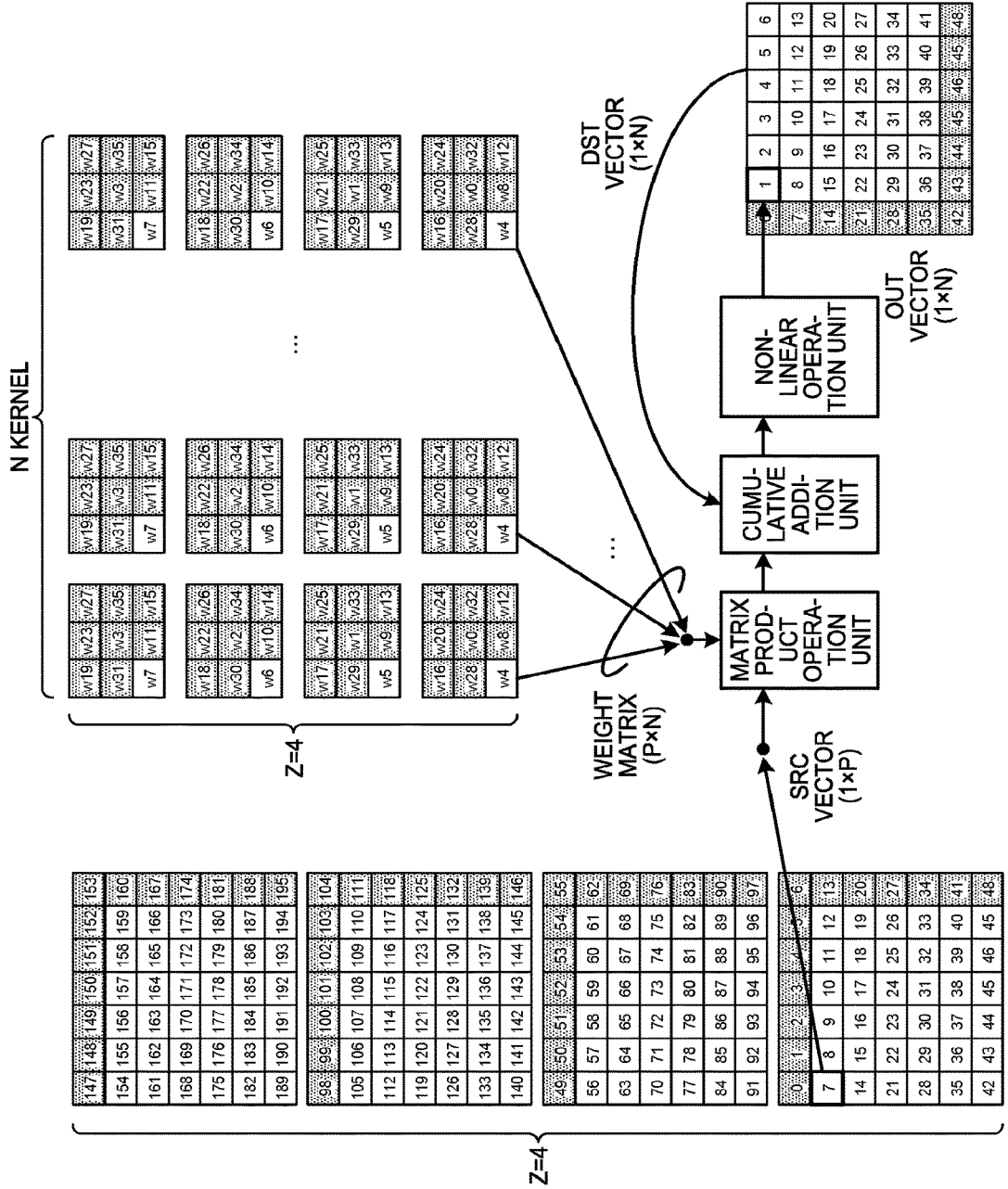
FIG. 17 is a diagram illustrating an example of processing at Step S403 in FIG. 14.

FIG. 17 is a diagram illustrating an example of processing at Step S403 in FIG. 14. The example of FIG. 17 is an example of processing using the lower left filter pixel. Unlike the case of using the center pixel, it should be noted that the processing ranges (processing sizes) of the SRC vector and the DST vector are not the whole elements in the x direction and the y direction. Gray rectangles in FIG. 17 indicate rectangles that are not used for calculation. In this example, the processing size is reduced from 7×7 to 6×6, the start address of the SRC vector is set to 7, and the start address of the DST vector and the OUT vector is offset by one. In this manner, desired processing is achieved.

In the present embodiment, parameters, such as an offset of the processing size and an offset of the address, can be controlled with the setting register and the instruction operands.

Calculation can be executed by the same method in accordance with the parameters of FIG. 14 for the remaining seven filter pixels illustrated at Step S404 to Step S410 of FIG. 14. After the processing at Step S410 is finished, the two-dimensional convolution processing is ended.

Figure 18:
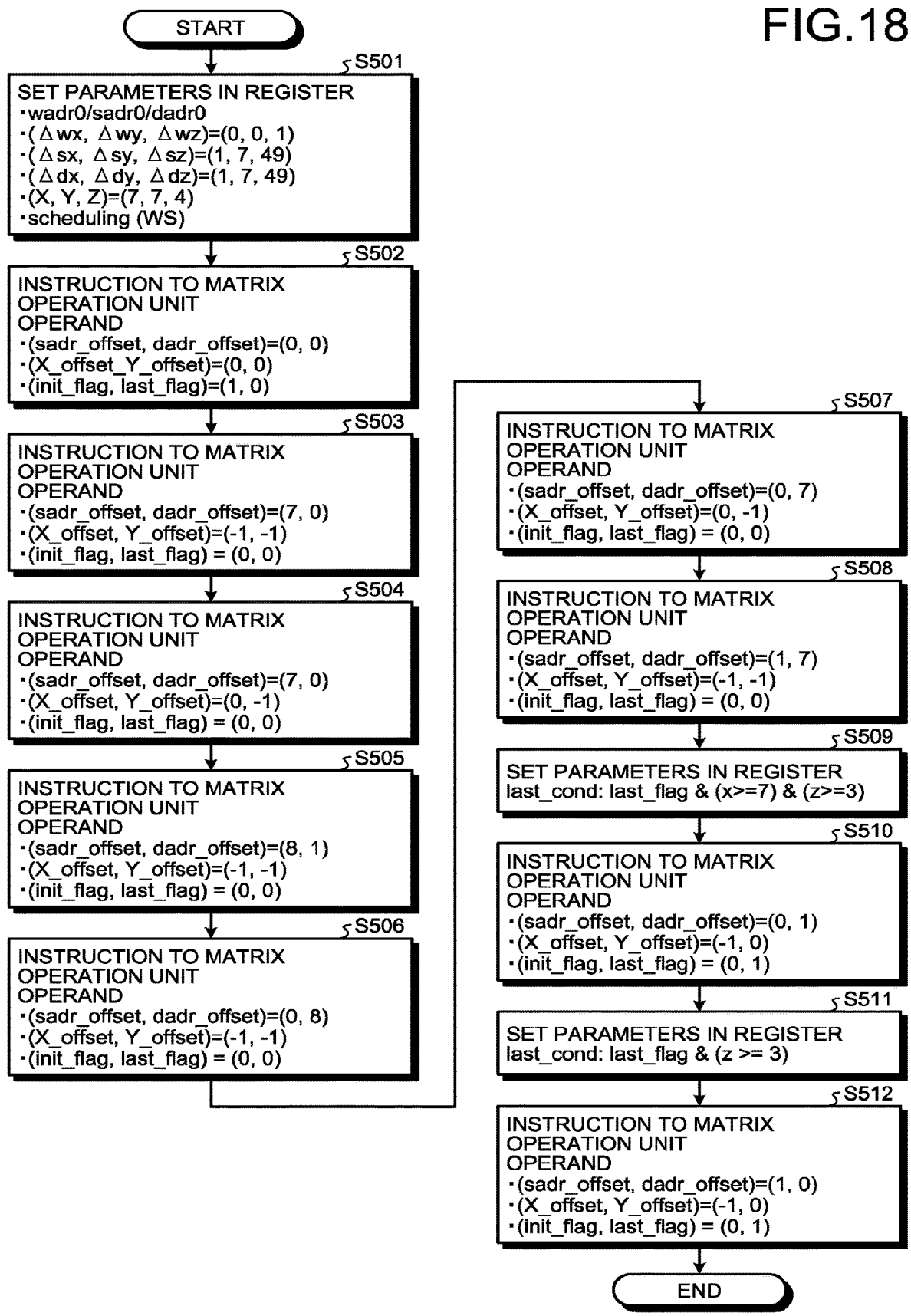
FIG. 18 is a flowchart of the case where convolution processing and a nonlinear operation are executed together.

FIG. 14 illustrates an example in which the last conditions are not considered, that is, an example to which no nonlinear operation is applied. The following is an explanation of an example to which a nonlinear operation is applied. FIG. 18 is an example of a flowchart in the case of executing convolution processing and a nonlinear operation together.

The last flag is used for executing a nonlinear operation successively after the convolution processing. However, for example, simply setting the last flag (last_flag) to 1 at the last step S410 in FIG. 14 is insufficient. This is because all the pixels of the DST vector are not calculated except for the case of using the center pixel of the filter, and no nonlinear operation is applied to part of the elements. Step S501 to Step S508 of FIG. 18 are the same as Step S401 to Step S407 of FIG. 14. In addition, Step S510 is different from Step S409 and Step S512 is different from Step S410 only in that 1 is set as the last flag, not 0.

FIG. 18 additionally includes processing (Step S509 and Step S511) of setting parameters to determine the application range of the last flag. Specifically, at Step S511, a nonlinear operation is applied to the whole elements in the x direction and the y direction when "z=3" is satisfied. At Step S509, a nonlinear operation is applied in the case where "(x=7)" and "(z=3)" are satisfied. By combining them, a nonlinear operation is applied to each of pixels of the whole elements in the x direction and the y direction. Such processing enables application of an additional nonlinear operation in a pipeline manner to data divided into two instructions.

In the example of FIG. 18, processing is executed for the initial conditions with one instruction and the last conditions divided into two instructions, but the initial conditions may be divided into two instructions, and the last conditions may be processed with one instruction. For example, suppose that the processing order of the filter illustrated in FIG. 15 is reversed, and processing is executed in the order of the largest number. In this case, because the center ("0" in FIG. 15) of the filter is processed lastly, the last condition can be executed with one instruction. By contrast, this case requires dividing and setting the initial conditions into two instructions (instructions corresponding to "8" and "7" in FIG. 15).

Figure 19:
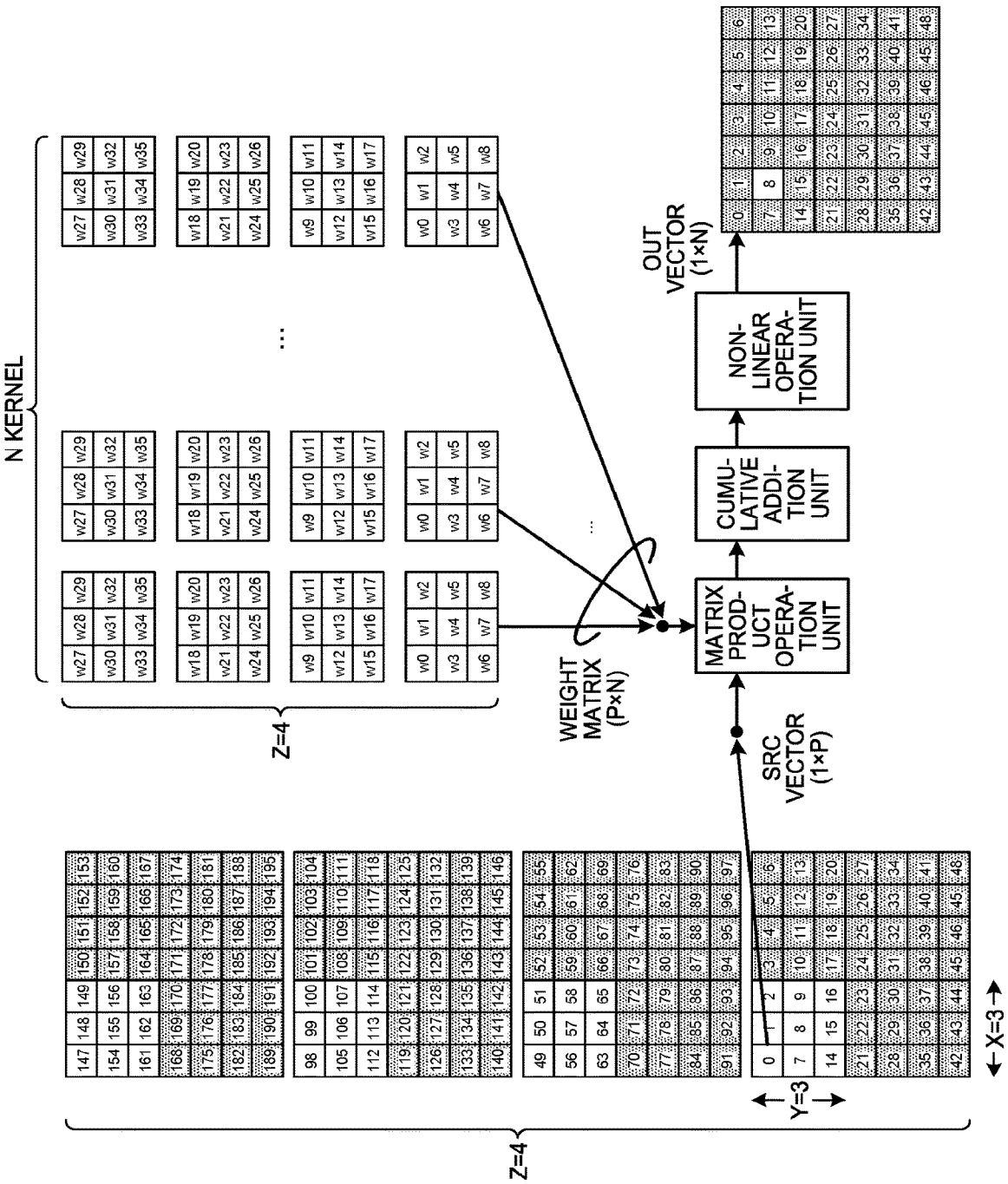
FIG. 19 is a diagram illustrating a calculation example of convolution processing with the OS1.

FIG. 19 is a diagram illustrating a calculation example of convolution processing with the OS1 in the matrix operation unit 400. FIG. 19 illustrates an example of executing calculation to output the eighth element of the OUT vector. In this example, the parameters are set as follows.

Processing size: (X,Y,Z)=(3,3,4)
Increment value:
($\Delta$wx,$\Delta$wy,$\Delta$wz)=(1,3,9)
($\Delta$sx,$\Delta$sy,$\Delta$sz)=(1,7,49)
($\Delta$dx,$\Delta$dy,$\Delta$dz)=(0,0,0)
Offset: dadr0+dadr_offset=8

In calculation of the other elements, it basically suffices that the start address of the SRC vector is incremented with sadr0 or sadr_offset. Elements at end portions in the x direction and the y direction can be processed by reducing the size of the filter actually used for calculation with X_offset and Y_offset, if necessary. In addition, the start address of the weight matrix should be offset with wadr_offset.

Generally, the WS can describe convolution processing with a smaller number of instructions than the OS1 in many cases. In the example described above, when instructions necessary for register setting are excluded, the WS can achieve convolution processing with nine instructions, while the OS1 requires 49 instructions for the same convolution processing.

Figure 20:
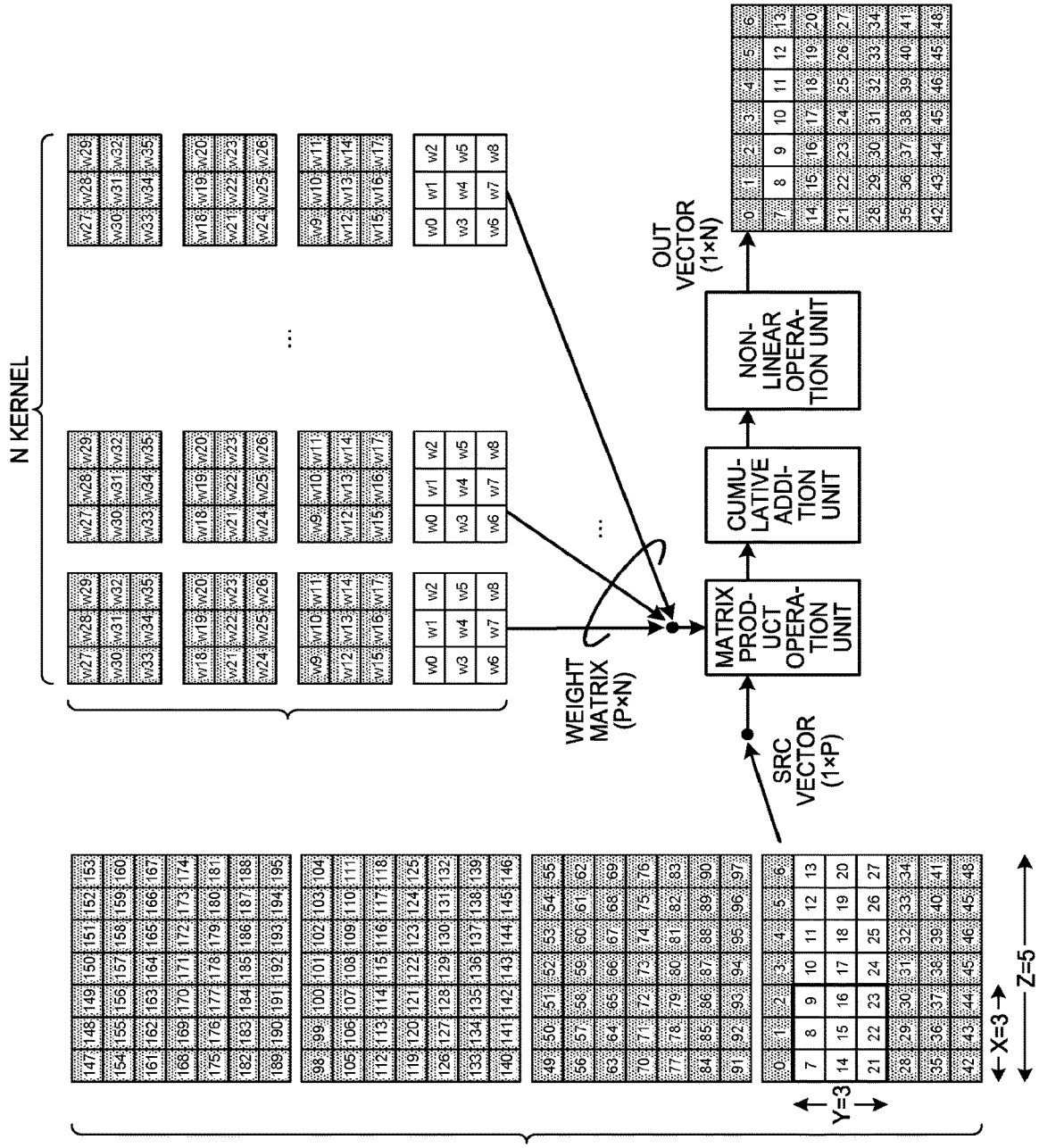
FIG. 20 is a diagram illustrating a calculation example of convolution processing with the OS2.

FIG. 20 is a diagram illustrating a calculation example of convolution processing with the OS2 in the matrix operation unit 400. In the example of FIG. 20, an arithmetic operation is executed by sliding the 3×3 filter in the x direction (the horizontal direction in the feature map) five times with one instruction. Specifically, the slide direction corresponds to the z direction, and the processing size in the z direction is set as "Z=5". In this example, the parameters are set as follows.

Processing size: (X,Y,Z)=(3,3,5)
Increment value:
($\Delta wx, \Delta wy, \Delta wz$)=(1,3,0)
($\Delta sx, \Delta sy, \Delta sz$)=(1,7,1)
($\Delta dx, \Delta dy, \Delta dz$)=(0,0,1)

In the example of FIG. 19, accumulation of numerical values is executed in three dimensions of (X,Y,Z), and writing is executed once lastly. By contrast, in the example of FIG. 20, accumulation of numerical values is executed in two dimensions of (X,Y) is repeated Z times.

Figure 21:
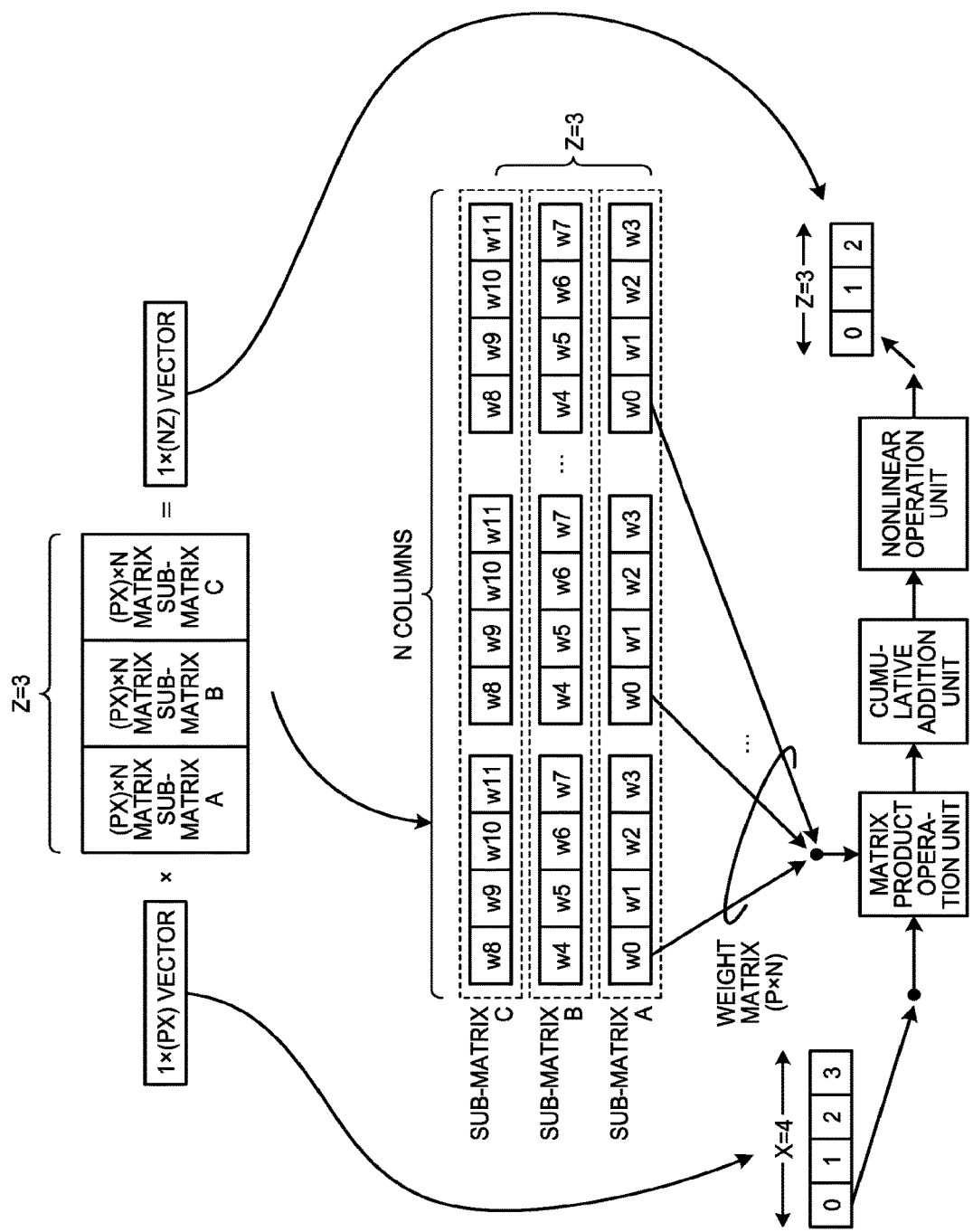
FIG. 21 is a diagram illustrating fully connected layer processing with the OS2.

FIG. 21 is a diagram illustrating fully connected layer processing with the OS2 in the matrix operation unit 400. In fully connected layer processing, parameters are set such that the whole matrix of the fully connected layer serving as the processing target is divided into a plurality of P×N-dimensional matrixes (weight matrixes) and processed. For example, when the matrix size of the fully connected layer is regarded as (PX)×(NZ) and parameters are properly set, the whole matrix product of the fully connected layer can be processed with one instruction, excluding register setting.

In this example, the parameters are set as follows.
Processing size: (X,Y,Z)=(4,1,3)
Increment value:
($\Delta wx, \Delta wy, \Delta wz$)=(1,0,4)
($\Delta sx, \Delta sy, \Delta sz$)=(1,0,0)
($\Delta dx, \Delta dy, \Delta dz$)=(0,0,1)

As described above, in the example of FIG. 21, the processing size (X,Y,Z) can be regarded as "(X,Y,Z)=(4,1,3)". When the size of the whole matrix of the fully connected layer cannot be accurately expressed as (PX)×(NZ), the size can be adjusted by zero padding.

To execute operation processing with high efficiency (low power consumption and high speed), it is desirable to enable execution of reading of data from the storage 600 at higher speed. The present embodiment is configured to use the storage 600 capable of executing, in parallel, at least two processing of reading processing of the SRC vector, reading processing of the weight matrix, reading processing of the DST vector, and writing processing of the OUT vector.

Figure 22:
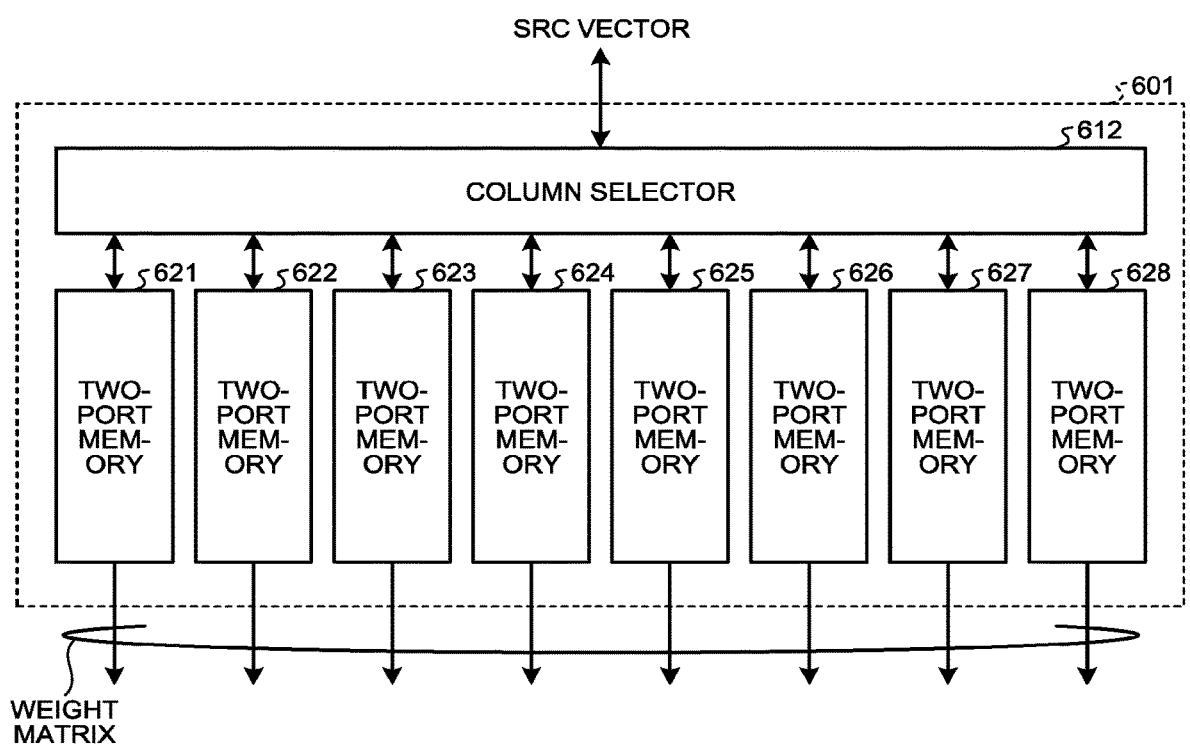
FIG. 22 is a diagram illustrating a configuration example of a shared memory.

FIG. 22 is a diagram illustrating a configuration example of a shared memory 601 in the storage 600. As illustrated in FIG. 22, the shared memory 601 includes, for example, N (N=8 in the example of FIG. 22) two-port memories and a column selector 612. One word of the two-port memories 621 to 628 of FIG. 22 has a size capable of storing therein an SRC vector including P elements. Each of the two-port memories 621 to 628 is a memory capable of storing therein, for example, Q (Q is an integer of 1 or more) P-dimensional vectors. The P×N-dimensional weight matrix corresponds to a data size of N words. For example, the weight matrix is divided into the N two-port memories 621 to 628 for each word and stored therein.

Writing and reading of data to and from a desired memory address in the shared memory 601 can be executed using the column selector 612. Although FIG. 22 illustrates one column selector 612, a plurality of column selectors 612 may be provided. Reading of the SRC vector is executed via the column selector 612. Reading of the weight matrix is executed in parallel, for example, from the same address of the N two-port memories 621 to 628.

As the method for designating the address of the weight matrix from the outside of the storage 600, for example, a method of using the address (address viewed from the outside of the storage 600) of the leftmost two-port memory 621 may be applied. In this case, the number of bits of the address necessary for designating the weight matrix may be omitted by LOG 2 (N) bits in comparison with the address space of the whole shared memory 601. In the example of FIG. 22, addresses are allocated to the two-port memory 621, such as 0, 8, 16, . . . , and, by designating the address, data of the corresponding columns of the other two-port memories 622 to 628 are also read. In this case, the number of bits of the address required can be omitted by LOG 2 (8)=3 bits.

Using the configuration of the storage 600 as described above enables read of the SRC vector and the weight matrix in parallel, and retention of high operation rate in the convolution processing and the fully connected layer processing.

Figure 23:
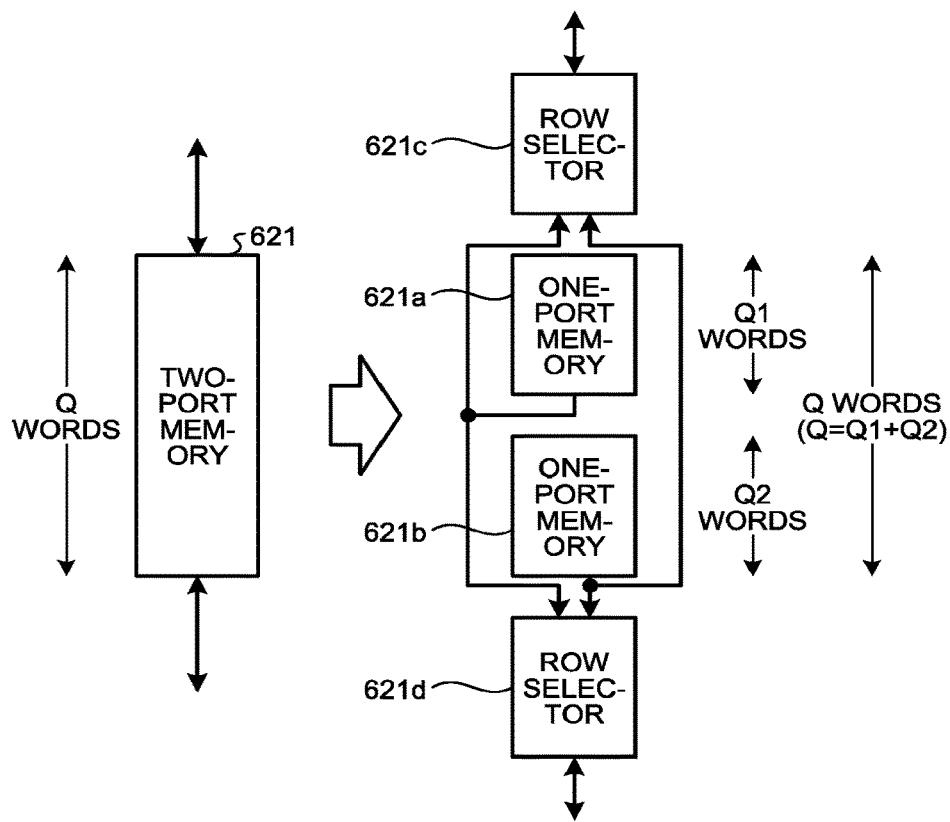
FIG. 23 is a diagram illustrating a configuration example in which a two-port memory is achieved with one-port memories.

FIG. 23 is a diagram illustrating a configuration example in which the two-port memory 621 of FIG. 22 is achieved with a combination of one-port memories. FIG. 22 illustrates the two-port memory 621, but the other two-port memories 622 to 628 can be configured in the same manner.

As illustrated in FIG. 23, the two-port memory 621 may include two one-port memories 621a and 621b. For example, when the number of words of the two-port memory 621 is Q, the two-port memory 621 may have the configuration acquired by combining a one-port memory 621a of Q1 words, a one-port memory 621b of Q2 words satisfying "Q1+Q2=Q", and row selectors 621c and 621d. However, configuring the two-port memory 621 with one-port memories may cause constraints that the SRC vector and the weight matrix stored in the same one-port memory cannot be read simultaneously. However, in the case where the SRC vector exists in the one-port memory 621a and the weight matrix exists in the one-port memory 621b, the SRC vector and the weight matrix can be read in parallel.

Figure 24:
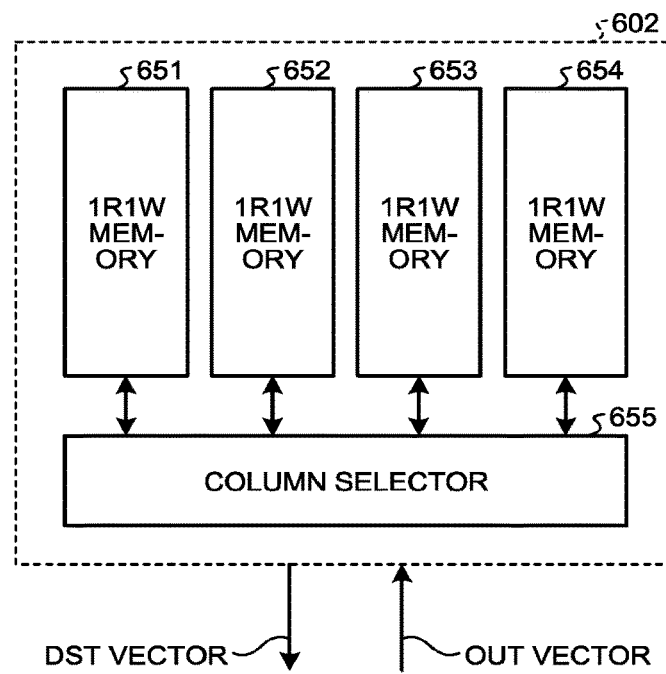
FIG. 24 is a diagram illustrating a configuration example of an intermediate memory.

FIG. 24 is a diagram illustrating a configuration example of the intermediate memory 602. The intermediate memory 602 includes a plurality of (four in the example of FIG. 24) 1R1W memories 651 to 654 and a column selector 655. One word of each of the 1R1W memories 651 to 654 has a size capable of storing therein the DST vector or the OUT vector formed of N elements. The reason of a plurality of banks adopted is to execute processing, such as moving data using a DMA instruction, while executing an arithmetic operation in the matrix operation unit 400. The example uses the 1R1W memories 651 to 654 each capable of executing one reading (READ) and one writing (WRITE) in parallel. As long as the intermediate memory 602 can be dealt with equivalently as viewed from the outside, the intermediate memory 602 may be formed of two-port memories or one-port memories. Access to any of the 1R1W memories 651 to 654 is enabled by using the column selector 655.

Figure 25:
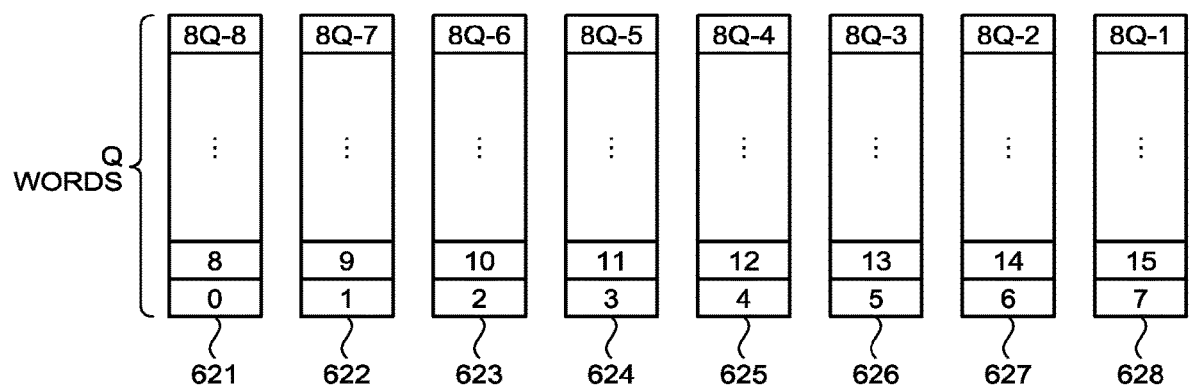
FIG. 25 is a diagram illustrating a configuration example of allocation of addresses of the shared memory.

FIG. 25 is a diagram illustrating a configuration example of allocation of addresses of the shared memory 601 (two-port memories 621 to 628). The numerical values correspond to addresses. In the configuration example of FIG. 25, continuous addresses are allocated to the two-port memories 621 to 628 of the same row. Thereafter, an address incremented by one is allocated to a region of the two-port memory 621 adjacent in the word direction, and thereafter similar allocation is repeated.

Figure 26:
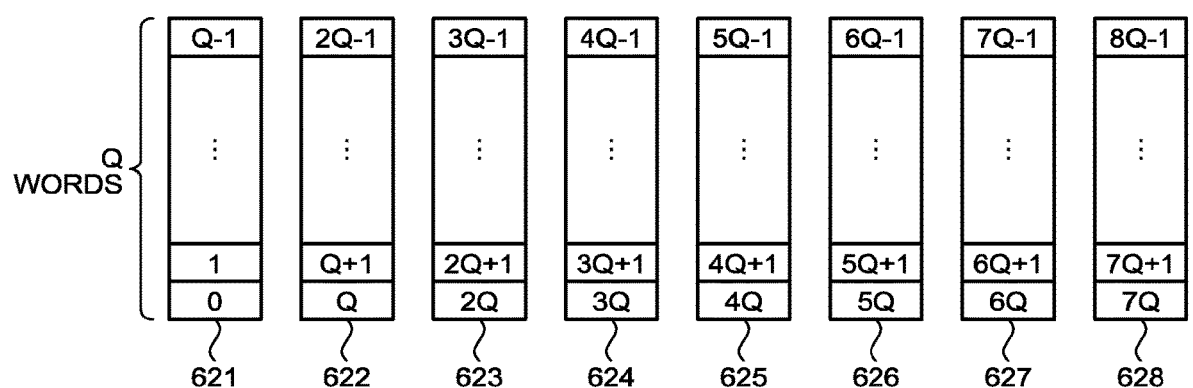
FIG. 26 is a diagram illustrating another configuration example of allocation of addresses of the shared memory.

FIG. 26 is a diagram illustrating another configuration example of allocation of addresses of the shared memory 601 (two-port memories 621 to 628). The numerical values correspond to addresses. In the configuration example of FIG. 26, addresses are allocated successively in the same two-port memory.

The allocation method of FIG. 26 is considered as a more ordinary method, but the allocation method of FIG. 25 is capable of reducing the possibility of occurrence of contention, for example, at the time when DMA processing and matrix operation processing access continuous memory addresses.

Modification

A three-dimensional processing loop is used in the embodiment described above, as illustrated in the flowchart of FIG. 5 and the flowcharts of FIG. 12A and FIG. 12B, but the processing loop can be expanded to a four-dimensional loop or more.

Figure 27:
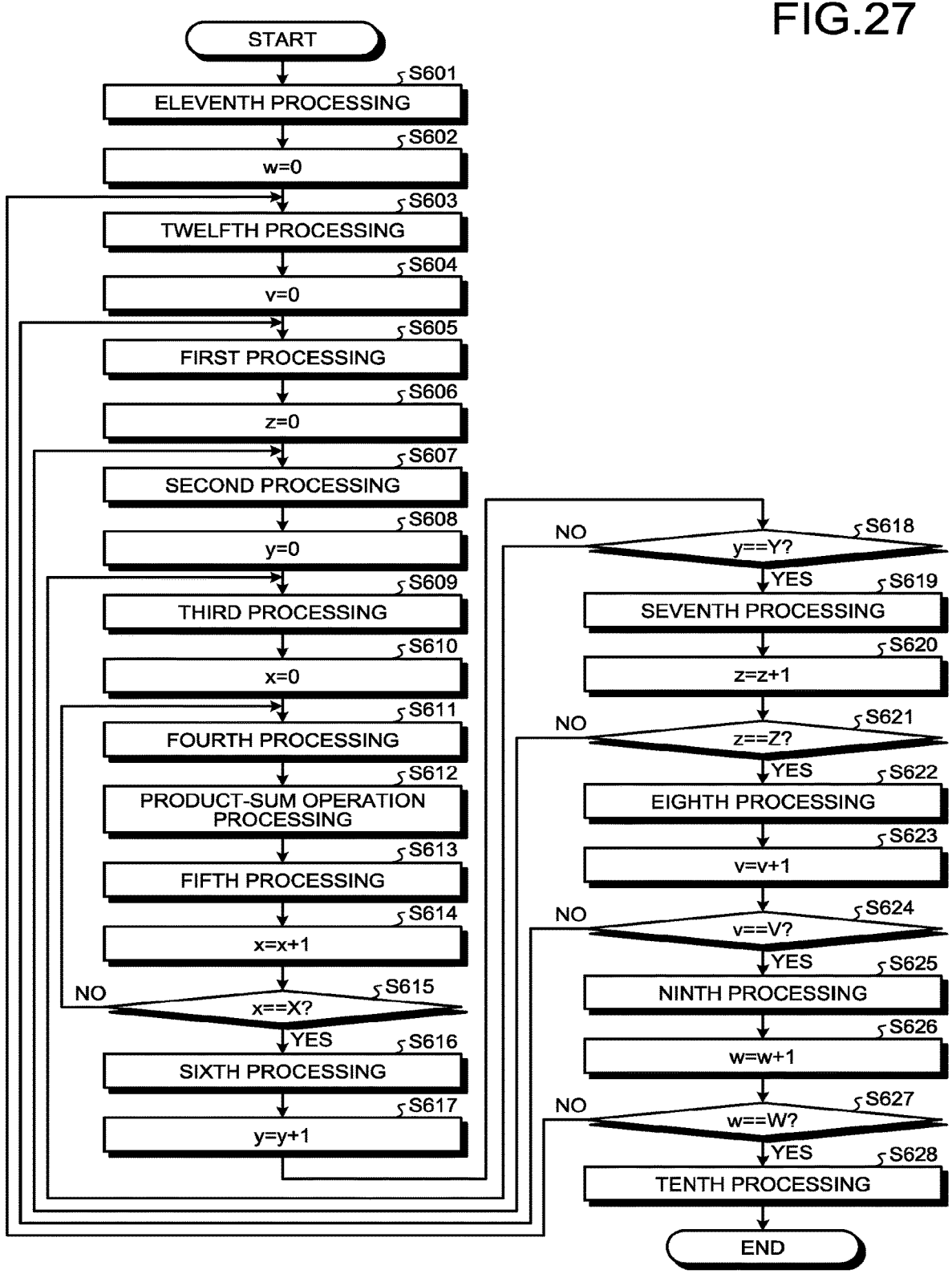
FIG. 27 is a flowchart illustrating an example of matrix operation processing using a five-dimensional processing loop.

FIG. 27 is a flowchart illustrating an example of matrix operation processing using a five-dimensional processing loop. FIG. 27 is an example acquired by expanding the flowchart of FIG. 5 from the three dimensions to five dimensions. Step S605 to Step S622 of FIG. 27 are the same as Step S101 to Step S118 of FIG. 5. In FIG. 27, processes for dimensions in a V direction and a W direction are further added to the part outside the processing loop of Step S605 to Step S622. Any of the four processes illustrated in FIG. 6 can be designated as ninth processing to twelfth processing (Step S625, Step S628, Step S601, and Step S603).

The matrix operation unit 400 initializes the corresponding variable before each of the loops of the added dimensions. For example, the matrix operation unit 400 initializes w and v, such as "w=0" (Step S602) and "v=0" (Step S604). When the processing in the added loop is ended, the matrix operation unit 400 adds 1 to the corresponding counter (v or w) (Step S623 or Step S626). In addition, the matrix operation unit 400 determines whether the counter satisfies the finish condition (Step S624 and Step S627).

Figure 28:
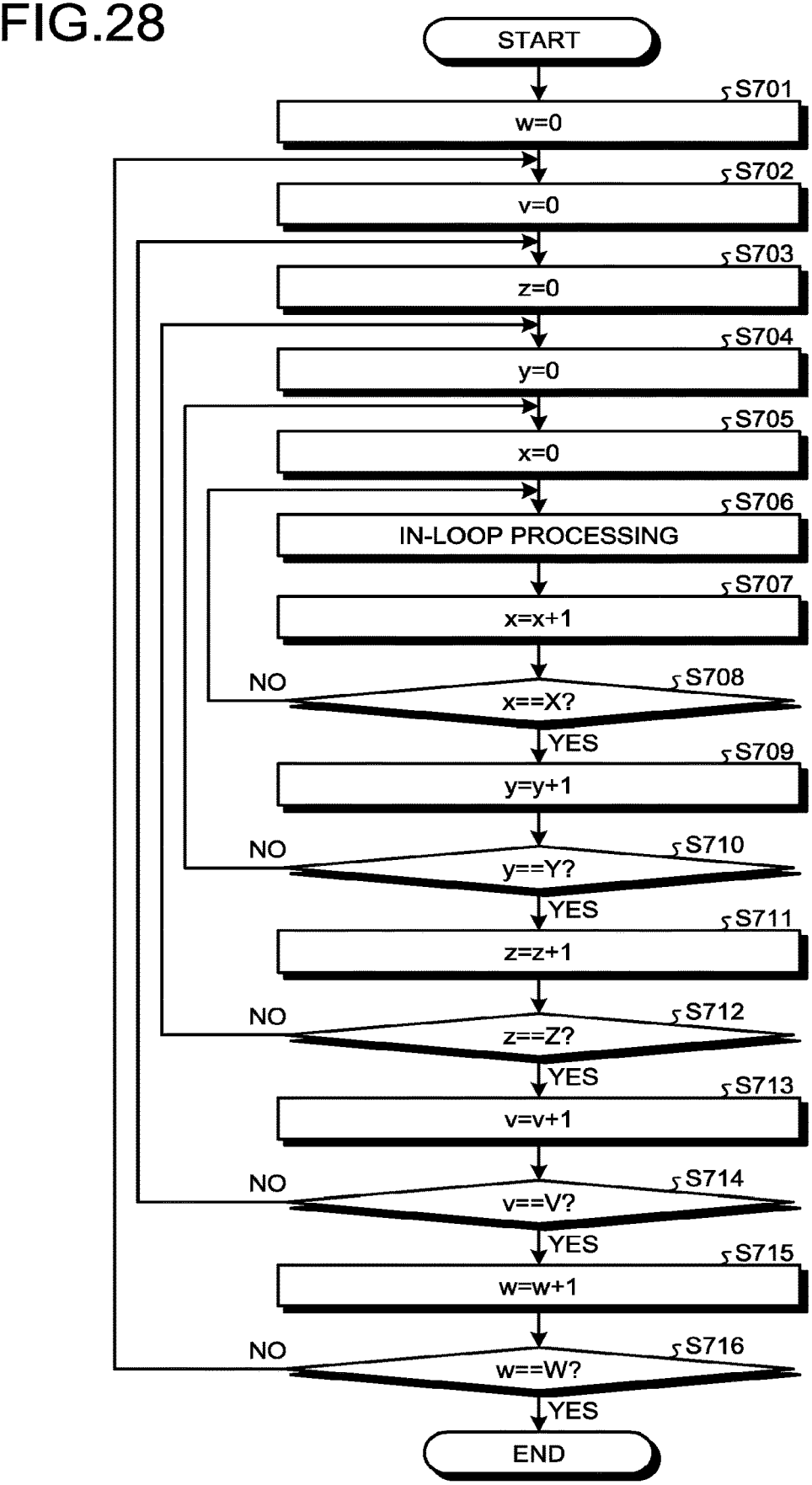
FIG. 28 is a flowchart illustrating another example of the matrix operation processing using a five-dimensional processing loop.

FIG. 28 is a flowchart illustrating another example of the matrix operation processing using a five-dimensional processing loop. FIG. 28 is an example acquired by expanding the flowchart of FIG. 12A from the three dimensions to five dimensions. Step S703 to Step S712 of FIG. 28 are the same as Step S201 to Step S210 of FIG. 12A. In FIG. 28, processes for dimensions in the V direction and the W direction are further added to the part outside the processing loop of Step S703 to Step S712.

The matrix operation unit 400 initializes each of the counters used in the added dimensions, such as "w=0" and "v=0" (Step S701 and Step S702). When the processing in the added loop is finished, the matrix operation unit 400 adds 1 to the corresponding counter (v or w) (Step S713 or Step S715). In addition, the matrix operation unit 400 determines whether the counter satisfies the end condition (Step S714 and Step S716).

A four-dimensional processing loop is a subset of a five-dimensional processing loop, and can be set as processing in which the V direction or the W direction does not exist.

FIG. 29 is a diagram illustrating examples of parameters added in the case of expanding the dimensions of the processing loop from the three dimensions to the five dimensions. The whole parameters are acquired by putting the parameters illustrated in FIG. 4 and the parameters illustrated in FIG. 29 together. As illustrated in FIG. 29, the corresponding parameters are added by expansion from three dimensions of (x,y,z) to five dimensions of (v,w,x,y,z).

The addresses defined with Expression (1) to Expression (3) can be expanded to the following Expressions (4) to Expression (6), respectively, in the five-dimensional processing loop.

$$wadr=wadr0+wadr\_offset+v\Delta wv+w\Delta ww+x\Delta wx+y\Delta wy+z\Delta wz \quad (4)$$

$$sadr=sadr0+sadr\_offset+v\Delta sv+w\Delta sw+x\Delta sx+y\Delta sy+z\Delta sz \quad (5)$$

$$dadr=dadr0+dadr\_offset+v\Delta dv+w\Delta dw+x\Delta dx+y\Delta dy+z\Delta dz \quad (6)$$

In addition, it suffices that the configuration examples (INIT1) to (INIT4) of the initial conditions in the three-dimensional processing and the configuration examples (LAST1) to (LAST4) of the last conditions are expanded to the following (INIT5) to (INIT8) and (LAST5) to (LAST8), respectively.

(INIT5):
init_condition(init_flag, v, w, x, y, z)=(init_flag==1)&
((v≤init_cond_v)&(w≤init_cond_w)&(x≤init_cond_x)&
(y≤init_cond_y)&(z≤init_cond_z)

(INIT6):
init_condition(init_flag, v, w, x, y, z)=(init_flag==1)&
((v≤init_cond_v)|(w≤init_cond_w)|(x≤init_cond_x)|
(y≤init_cond_y)|(z≤init_cond_z)

(INIT7):
init_condition (init_flag, v, w, x, y, z)=(init_flag==1)&
((v≥init_cond_v)&(w≥init_cond_w)&(x≥init_cond_x)&
(y≥init_cond_y)&(z≥init_cond_z)

(INIT8):
init_condition (init_flag, v, w, x, y, z)=(init_flag==1)&
((v≥init_cond_v)|(w≥inti_cond_w)|(x≥init_cond_x)|
(y≥init_cond_y)|(z≥init_cond_z)

(LAST5):
last_condition (last_flag, v, w, x, y, z)=(last_flag==1)&
((v≤last_cond_v)&(w≤last_cond_w)&(x≤last_cond_x)&
(y≤last_cond_y)&(z≤last_cond_z)

(LAST6):
last_condition (last_flag, v, w, x, y, z)=(last_flag==1)&
((v≤last_cond_v)|(w≤last_cond_w)|(x≤last_cond_x)|
(y≤last_cond_y)|(z≤last_cond_z)

(LAST7):
last_condition (last_flag, v, w, x, y, z)=(last_flag==1)&
((v≥last_cond_v)&(w≥last_cond_w)&(x≥last_cond_x)&
(y≥last_cond_y)&(z≥last_cond_z)

(LAST8):
last_condition (last_flag, v, w, x, y, z)=(last_flag==1)&
((v≥last_cond_v)|(w≥last_cond_w)|(x≥last_cond_x)|
(y≥last_cond_y)|(z≥last_cond_z)

In addition, the first method for determining whether the write conditions in the three-dimensional processing are satisfied can be expanded to the following second method.

Second method for determining whether the write conditions are satisfied:

(Δdx!=0)|
(Δdx=0&Δdy!=0&x=X-1)|
(Δdx=0&Δdy=0&Δdz!=0&x=X-1&y=Y-1)|
(Δdx=0&Δdy=0&Δdz=0&Δdv!=0&x=X-1&y=Y-1&z=Z-1)|
(Δdx=0&Δdy=0&Δdz=0&Δdv=0&Δdw!=0&x=X-1&y=Y-1&z=Z-1&v=V-1)|
(Δdx=0&Δdy=0&Δdz=0&Δdv=0&Δdw=0&x=X-1&y=Y-1&z=Z-1&v=V-1&w=W-1)

FIG. 30 is a diagram illustrating an example of allocation patterns (scheduling) of the processing in the flowchart of FIG. 27. The example of FIG. 30 is basically acquired by expanding the example of FIG. 6 as it is. The degree of freedom of allocations can be increased by expansion from the three dimensions to the five dimensions.

Figure 31:
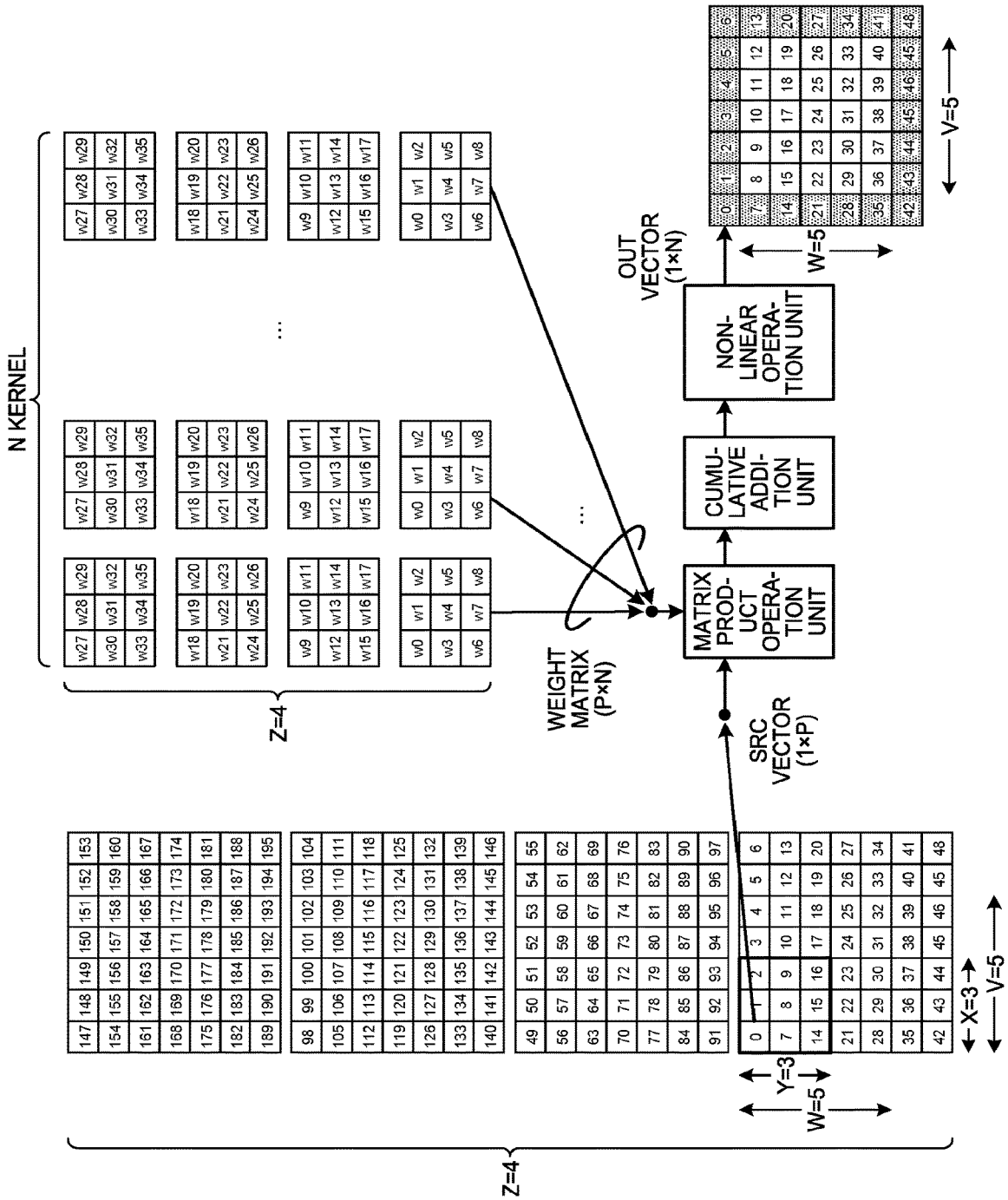
FIG. 31 is a diagram illustrating a calculation example of convolution processing in the OS1.

FIG. 31 is a diagram illustrating a calculation example of convolution processing with the OS1 in the matrix operation unit 400. FIG. 31 corresponds to an example acquired by expanding the processing in the three dimensions illustrated in FIG. 19 to five dimensions. In the example, the parameters are set as follows.

Processing size: (V,W,X,Y,Z)=(5,5,3,3,4)
Increment Value:
(Δwv,Δww,Δwx,Δwy,Δwz)=(0,0,1,3,9)
(Δsv,Δsw,Δsx,Δsy,Δsz)=(1,7,1,7,49)
(Δdv,Δdw,Δdx,Δdy,Δdz)=(1,7,0,0,0)
Offset: dadr0+dadr_offset=8

In the example of the three-dimensional processing in FIG. 19, because cumulative addition is executed in the (X,Y,Z) directions, no degree of freedom can be assigned to the direction in which the OUT vector changes, and only one OUT vector can be calculated.

In the example of FIG. 31, because the degrees of freedom for two dimensions are added, it becomes possible to two-dimensionally move the output coordinates of the OUT vector in the (V,W) directions, in addition to the cumulative addition in the (X,Y,Z) directions. In the example of FIG. 31, five-dimensional processing is adopted to enable finish of convolution processing with the range of 25 addresses (W×V=5×5=25) with one instruction. However, the elements other than the 25 addresses is required to be processed with another instruction, because the filter size is required to be reduced from 3×3.

Figure 32:
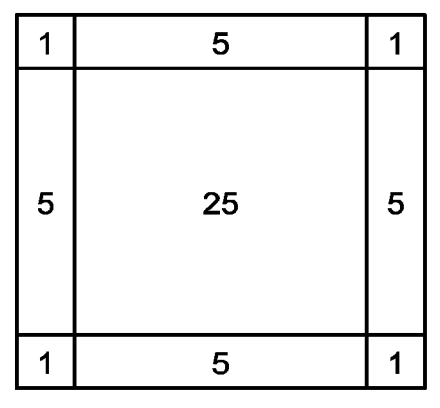

FIG. 32 is a diagram illustrating a division example of the convolution processing illustrated in FIG. 31. FIG. 32 illustrates the processing range of the 7×7 OUT vector, and each of the nine divided rectangles serves as a range that can be processed with one instruction. Each of the ranges to which the filters having the same processing range are applied is divided as one rectangle. The numerical values in FIG. 32 indicate the numbers of addresses that can be processed with one instruction. The addresses corresponding to the range of "W×V=5×5" illustrated in FIG. 31 are 25 addresses illustrated in the center of FIG. 32. In the division example illustrated in FIG. 32, the addresses can be divided and processed with nine instructions in total.

The explanation described above mainly illustrates the example of processing a feature map based on two-dimensional image data, but other multi-dimensional data, such as three-dimensional image data or more, may serve as the processing target. The three-dimensional data is, for example, three-dimensional image data using computed tomography (CT) or magnetic resonance imaging (MRI).

As described above, the arithmetic device 100 according to the present embodiment enables execution of D-dimensional processing in which the parameters can be controlled, using the storage 600 storing data therein, the DMA unit 300 executing data transfer between the memories, the matrix operation unit 400 executing operation processing, and the controller 200 executing parameter setting and processing instruction for the DMA unit 300 and the matrix operation unit 400. This configuration enables execution of processing at high speed without decrease in an operation rate of operation processing, such as convolution processing and matrix operation processing used in a neural network or the like.

A computer program executed in the arithmetic device according to the present embodiment is provided in a state of being installed in advance in the storage 600 (instruction memory 603) or the like.

The computer program executed in the arithmetic device according to the present embodiment may be configured to be recorded as a file in an installable form or an executable form in a computer-readable recording medium, such as a compact disc read only memory (CD-ROM), a compact disc recordable (CD-R), and a digital versatile disc (DVD), and provided as a computer program product.

In addition, the computer program executed in the arithmetic device according to the present embodiment may be configured to be stored in a computer connected to a network, such as the Internet, and provided by download through the network. The computer program executed in the arithmetic device according to the present embodiment may be configured to be provided or distributed through a network, such as the Internet.

The computer program executed in the arithmetic device according to the present embodiment can cause a computer to function as each of the units of the arithmetic device described above. The computer is capable of reading, with the controller 200, the computer program from a computer-readable storage medium onto a main storage device and executing the computer program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An arithmetic device comprising:
    storage storing therein one or more P-dimensional input vectors, one or more P×N-dimensional matrixes, one or more N-dimensional intermediate value vectors, and one or more N-dimensional output vectors, and capable of executing, in parallel, two or more of reading processing of the input vector, reading processing of the matrix, reading processing of the intermediate value vector, and writing processing of the output vector, P being an integer of 2 or more, N being an integer of 2 or more;
    a controller setting read timings and write timing in operation processing including a D-dimensional (D is an integer of 3 or more) processing loop, the read timings being timings of a first input vector to be read in the input vectors, a first matrix to be read in the matrixes, and a first intermediate value vector to be read in the intermediate value vectors, the write timing being timing of a first output vector to be written in the output vectors; and operation circuitry calculating product of the first input vector and the first matrix read from the storage in accordance with the read timings, calculating sum of the product and the first intermediate value vector read from the storage in accordance with the read timing, and storing the sum as the first output vector in the storage at the write timing.

2. The arithmetic device according to claim 1, wherein
the controller sets a reference value of an address of the first input vector, a reference value of an address of the first matrix, and a reference value of an address of the first intermediate value vector, an increment value of the address of the first input vector, an increment value of the address of the first matrix, and an increment value of the address of the first intermediate value vector in a processing loop of each of dimensions included in the D dimensions, and the operation circuitry determines the addresses of the first input vector, the first matrix, and the first intermediate value vector on the basis of the corresponding reference values and increment values.

3. The arithmetic device according to claim 1, wherein
the controller sets an offset for the reference value of the address of the first input vector, an offset for the reference value of the address of the first matrix, and an offset for the reference value of the address of the first intermediate value vector, and the operation circuitry determines the addresses of the first input vector, the first matrix, and the first intermediate value vector on the basis of the corresponding offsets.

4. The arithmetic device according to claim 1, wherein
the controller sets a range of the first input vector, a range of the first matrix, and a range of the first intermediate value vector to be processed in a processing loop of each of dimensions included in the D dimensions, and an offset for the range of the first input vector, an offset for the range of the first matrix, and an offset for the range of the first intermediate value vector, and the operation circuitry determines the ranges of the first input vector, the first matrix, and the first intermediate value vector on the basis of the corresponding ranges and offsets.

5. The arithmetic device according to claim 1, further comprising:
a register storing therein an initial value of the intermediate value vector, wherein
the operation circuitry reads the first intermediate value vector from the register when a set initial condition is satisfied.

6. The arithmetic device according to claim 5, wherein the initial condition includes a condition to limit a range of data to which processing executed when the initial condition is satisfied is applied.

7. The arithmetic device according to claim 1, wherein the operation circuitry executes a nonlinear operation for the output vector when a set last condition is satisfied, and stores the first output vector for which the nonlinear operation has been executed in the storage at the write timing.

8. The arithmetic device according to claim 7, wherein the last condition includes a condition to limit a range of data to which processing executed when the last condition is satisfied is applied.

9. The arithmetic device according to claim 1, wherein the controller sets the read timings on the basis of parameters determining whether to update values of addresses designating the first input vector, the first matrix, and the first intermediate value vector in the processing loop.

10. The arithmetic device according to claim 1, wherein
the storage includes a plurality of memories each capable of storing therein Q P-dimensional vectors and accessible simultaneously, Q being an integer of 1 or more,
the input vectors, the intermediate value vectors, and the output vectors are stored in any of the memories, and
the matrix is divided into N memories in the memories, and stored therein.

11. An arithmetic method executed in an arithmetic device including storage,
the storage storing therein one or more P-dimensional input vectors, one or more P×N-dimensional matrixes, one or more N-dimensional intermediate value vectors, and one or more N-dimensional output vectors, and capable of executing, in parallel, two or more of reading processing of the input vector, reading processing of the matrix, reading processing of the intermediate value vector, and writing processing of the output vector, P being an integer of 2 or more, N being an integer of 2 or more,
the arithmetic method comprising:
controlling by setting read timings and write timing in operation processing including a D-dimensional (D is an integer of 3 or more) processing loop, the read timings being timings of a first input vector to be read in the input vectors, a first matrix to be read in the matrixes, and a first intermediate value vector to be read in the intermediate value vectors, the write timing being timing of a first output vector to be written in the output vectors; and
calculating product of the first input vector and the first matrix read from the storage in accordance with the read timings, calculating sum of the product and the first intermediate value vector read from the storage in accordance with the read timing, and storing the sum as the first output vector in the storage at the write timing.

* * * * *